US012499900B2

(12) United States Patent
Ragot et al.

(10) Patent No.: US 12,499,900 B2
(45) Date of Patent: Dec. 16, 2025

(54) OPTIMISED SPHERICAL VECTOR QUANTISATION

(71) Applicant: ORANGE, Issy-les-Moulineaux (FR)

(72) Inventors: Stéphane Ragot, Chatillon (FR); Mohamed Yaoumi, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 184 days.

(21) Appl. No.: 18/570,904

(22) PCT Filed: Jul. 5, 2022

(86) PCT No.: PCT/FR2022/051337

§ 371 (c)(1),
(2) Date: Dec. 15, 2023

(87) PCT Pub. No.: WO2023/285748

PCT Pub. Date: Jan. 19, 2023

(65) Prior Publication Data

US 2024/0304198 A1 Sep. 12, 2024

(30) Foreign Application Priority Data

Jul. 15, 2021 (EP) .................................... 21305987

(51) Int. Cl.

*G10L 19/035* (2013.01)
*G10L 19/008* (2013.01)
*G10L 19/038* (2013.01)

(52) U.S. Cl.

CPC .......... *G10L 19/035* (2013.01); *G10L 19/008* (2013.01); *G10L 19/038* (2013.01)

(58) Field of Classification Search

CPC .... G10L 19/035; G10L 19/008; G10L 19/038
See application file for complete search history.

(56) References Cited

U.S. PATENT DOCUMENTS

2002/0122035 A1* 9/2002 Ng .......................... G06T 17/00 345/420
2008/0015852 A1* 1/2008 Kruger .................... G10L 19/12 704/E19.035

(Continued)

FOREIGN PATENT DOCUMENTS

EP 1879179 A1 1/2008
WO 2020177981 A1 9/2020

OTHER PUBLICATIONS

Daniel, A., "Spatial Auditory Blurring and Applications to Multichannel Audio Coding," Jun. 23, 2011 (Jun. 23, 2011), Retrieved from the Internet: URL:http://tel.archives-ouvertes.fr/tel-00623670/en/, XP055104301.

(Continued)

*Primary Examiner* — Shaun Roberts
(74) *Attorney, Agent, or Firm* — David D. Brush; Westman, Champlin & Koehler, P.A.

(57) ABSTRACT

A method for encoding an input point on an n-dimensional sphere by encoding n−1 spherical coordinates of said input point. The method includes sequential scalar quantization of the n−1 spherical coordinates in order to obtain at most $2^{n-2}$ candidates at the end of the sequential scalar quantization of the n−1 coordinates, and subsequently selecting the best candidate which minimizes a distance between the input point and the at most $2^{n-2}$ candidates, and determining the separate quantization indices resulting from the sequential scalar quantization of the spherical coordinates of the best candidate and sequentially encoding the separate quantization indices of the best candidate. A corresponding decoding method, an encoding device and a decoding device are also provided.

19 Claims, 6 Drawing Sheets

(56) References Cited

U.S. PATENT DOCUMENTS

| | | | | |
|---|---|---|---|---|
| 2015/0332682 | A1* | 11/2015 | Kim | G10L 19/008 381/23 |
| 2015/0332691 | A1* | 11/2015 | Kim | G10L 19/038 704/222 |
| 2020/0265851 | A1* | 8/2020 | Fuchs | G10L 19/032 |
| 2021/0020185 | A1* | 1/2021 | Vasilache | H04S 7/00 |
| 2022/0386056 | A1* | 12/2022 | Vasilache | H04S 3/008 |
| 2023/0343346 | A1* | 10/2023 | Mcgrath | G10L 19/008 |

OTHER PUBLICATIONS

Perotin, L. et al., "CRNN-Based Multiple DoA Estimation Using Acoustic Intensity Features for Ambisonics Recordings," IEEE Journal of Selected Topics in Signal Processing, vol. 13, No. 1, Mar. 2019.

Mahé, P. et al., "First-Order Ambisonic Coding With PCA Matrixing and Quaternion-Based Interpolation," Proceedings of the 22nd International Conference on Digital Audio Effects (DAFx-19), Birmingham, UK, Sep. 2-6, 2019.

Mahe, P. et al., "First-order ambisonic coding with quaternion-based interpolation of PCA rotation matrices," EAA Spatial Audio Signal Processing Symposium, Sep. 2019, Paris, France. pp. 7-12, hal-02275181.

Pulkki, V., "Spatial Sound Reproduction with Directional Audio Coding*," Journal of Audio Engineering Soc., Engineering Reports, vol. 55, No. 6, Jun. 2007.

International Search Report dated Nov. 16, 2022 for corresponding International Application No. PCT/FR2022/051337, filed Jul. 5, 2022.

Written Opinion of the International Searching Authority dated Nov. 16, 2022 for corresponding International Application No. PCT/FR2022/051337, filed Jul. 5, 2022.

English translation of the Written Opinion of the International Searching Authority dated Nov. 16, 2022 for corresponding International Application No. PCT/FR2022/051337, filed Jul. 5, 2022.

* cited by examiner

OPTIMISED SPHERICAL VECTOR QUANTISATION

CROSS-REFERENCE TO RELATED APPLICATIONS

This Application is a Section 371 National Stage Application of International Application No. PCT/FR2022/051337, filed Jul. 5, 2022, which is incorporated by reference in its entirety and published as WO 2023/285748 A1 on Jan. 19, 2023, not in English.

FIELD OF THE DISCLOSURE

The present invention relates to spherical vector quantization applied to the coding/decoding of sound data, in particular spatialized data in an ambiophonic context (also referred to hereinafter as "ambisonic") for the coding of rotation matrices by way of a quaternion-based representation or else parametric coding in which source directions (abbreviated to "DoA" for direction of arrival) are quantized, but also for audio coding based on a mono transform serving as core coding to represent the spatialized sound data.

BACKGROUND OF THE DISCLOSURE

Encoders/decoders (hereinafter called "codecs") that are currently used in mobile telephony are mono (a single signal channel to be rendered on a single loudspeaker). The 3GPP EVS (for "Enhanced Voice Services") codec makes it possible to offer "Super-HD" quality (also called "High Definition Plus" or HD+ voice) with a super-wideband (SWB) audio band for signals sampled at 32 or 48 KHz or full band (FB) audio band for signals sampled at 48 kHz; the audio bandwidth is 14.4 to 16 kHz in SWB mode (9.6 to 128 kbit/s) and 20 kHz in FB mode (16.4 to 128 kbit/s).

The next quality evolution in conversational services offered by operators should consist of immersive services, using terminals such as smartphones equipped with multiple microphones or remote presence or 360° video spatialized audio-conferencing or video-conferencing equipment, or even "live" audio content sharing equipment, with spatialized 3D sound rendering that is much more immersive than simple 2D stereo rendering. With the increasingly widespread use of listening on a mobile telephone with an audio headset and the onset of advanced audio equipment (accessories such as a 3D microphone, voice assistants with acoustic antennas, virtual reality or augmented reality headsets, etc.), capturing and rendering spatialized sound scenes is now widespread enough to offer an immersive communication experience.

To this end, the future 3GPP standard "IVAS" (for "Immersive Voice And Audio Services") is proposing to extend the EVS codec to immersive audio by accepting, as codec input format, at least the spatialized sound formats listed below (and their combinations):

- stereo or 5.1 multichannel format (channel-based), in which each channel feeds a loudspeaker (for example L and R in stereo or L, R, Ls, Rs and C in 5.1);
- object format (object-based), in which sound objects are described as an audio signal (generally mono) associated with metadata describing the attributes of this object (position in space, spatial width of the source, etc.),
- ambisonic format (scene-based), which describes the sound field at a given point, generally picked up by a spherical microphone or synthesized in the domain of spherical harmonics.

There is also the issue of potentially considering other input formats such as the format called MASA (Metadata assisted Spatial Audio), which corresponds to a parametric representation of a sound pick-up on a mobile telephone equipped with multiple microphones.

The signals to be processed by the encoder/decoder take the form of successions of blocks of sound samples called "frames" or "subframes" below.

Furthermore, below, mathematical notations follow the following convention:

- Scalar: s or N (lower-case for variables or upper-case for constants)
- Vector: q (lower-case, bold and italicized)
- Matrix: M (upper-case, bold and italicized)

Hereinafter, we will denote the sphere $\mathbb{S}_n$ of radius r in dimension n+1 defined as $$\mathbb{S}_n = \left\{x = (x_1, \ldots , x_{n+1}) \in \mathbb{R}^{n+1} \;\middle|\; \|x\| = \sqrt{x_1^2 + \ldots + x_{n+1}^2} = r\right\}$$

where ||•|| denotes the Euclidean norm. When the radius r is not specified, it will be assumed that r=1 (unit sphere).

A reminder will be given here of the definition of the spherical coordinates in dimension 3 and 4. For a point (x,y,z) in dimension 3, there are generally at least two classical conventions of spherical coordinates (r, $\phi$, $\theta$):

- the geographical convention: x=r cos $\phi$ cos $\theta$, y=r cos $\phi$ sin $\theta$, z=r sin $\phi$ with r≥0, $-\pi/2 \le \phi \le \pi/2$ and $-\pi \le \theta \le \pi$
- the physical convention: x=r sin $\phi$ cos $\theta$, y=r sin $\phi$ sin $\theta$, z=r cos $\phi$ with r≥0, $0 \le \phi \le \pi$ and $-\pi \le \theta \le \pi$ The radius r and the azimuth (or longitude) $\theta$ are the same in these two definitions, but the angle $\phi$ differs depending on whether it is defined with respect to the horizontal plane 0xy (elevation or latitude over the interval [$-\pi/2$, $\pi/2$]) or based on the axis 0z (colatitude or polar angle over the interval [0, $\pi$]). The azimuth $\theta$ may be defined over an interval [$-\pi$, $\pi$], and, in equivalent fashion, it may be defined over [0, $2\pi$] by a simple operation of modulo $2\pi$. It is also possible to represent the same angular coordinates in another unit, for example in degrees. It should be noted that the symbols may be different in the literature (for example $\varphi$ instead of $\phi$) and/or swapped (for example $\theta$ for colatitude and $\varphi$ for longitude).

Moreover, the definition of spherical coordinates may be generalized in a higher dimension. For a point (w, x, y, z) in dimension 4, the mathematical convention of spherical coordinates (r, $\phi_1$, $\phi_2$, $\phi_3$) is adopted again here: w=r cos $\phi_1$, x=r sin $\phi_1$ cos $\phi_2$, y=r sin $\phi_1$ sin $\phi_2$ cos $\phi_3$, z=r sin $\phi_1$ sin $\phi_2$ sin $\phi_3$, where r≥0 is the radius, $\phi_1$ and $\phi_2$ are over [0, $\pi$] and $\phi_3$ over [$-\pi$, $\pi$] or, in equivalent fashion, over [0, $2\pi$]. It should be noted that it is possible to define other spherical coordinate systems, for example, for the case in dimension 4, it is possible to define three angles in addition to the radius r in the form: w=r cos $\omega$, x=r sin $\omega$ sin $\phi$ cos $\theta$, y=r sin $\omega$ sin $\phi$ sin $\theta$, z=r sin $\omega$ cos $\phi$; in this alternative, the angle $\omega$ is identical to the spherical coordinate $\phi_1$ defined above and, on the other hand, the last 3 components (x,y,z) are seen as a 3D point and represented here by the colatitude $\phi$ and the azimuth $\theta$ as defined above for dimension 3 with the physical convention—the angles $\phi_1$ and $\phi_2$ are therefore different from $\phi$ and $\theta$ because of the permutation of the coordinates and of the different conventions.

Generally speaking, it is possible to decompose a point in dimension n into a radius r (corresponding to the distance to the origin or the norm) and n−1 angular coordinates with n−2 angles over an interval of length π and an interval of length 2π.

In the invention, more particular consideration will be given to discretizations of the unit sphere $\mathbb{S}_n$ in dimension 3 and 4, where the radius is set to r=1, and the n−1 angular coordinates are quantized sequentially. However, according to the invention, dimensions other than 3 or 4 will be possible.

What are of interest in the invention are exemplary embodiments of spherical vector quantization applied to audio coding in general, and more particularly to spatialized sound coding, including the ambisonic format. This also includes parametric coding using 3D source directions. The invention may also be applied to other audio formats and to other signals in which spherical data in dimension n are to be coded, for example for transform-based audio coding in which each sub-band is coded by gain-shape spherical vector quantization.

A reminder will be given below of the principles of ambisonics and the coding thereof through principal component analysis (PCA) and DiRAC (for Directional Audio Coding) approaches.

In some variants, it is possible to apply the invention to other coding schemes, in particular for transform-based audio coding.

Ambisonics is a method for recording ("coding" in the acoustic sense) spatialized sound and a reproduction system ("decoding" in the acoustic sense). A (1st-order) ambisonic microphone comprises at least four capsules (typically of cardioid or sub-cardioid type) arranged on a spherical grid, for example the vertices of a regular tetrahedron. The audio channels associated with these capsules are called the "A-format". This format is converted into a "B-format", in which the sound field is decomposed into four components (spherical harmonics) denoted W, X, Y, Z, which correspond to four coincident virtual microphones. The component W corresponds to omnidirectional capturing of the sound field, while the components X, Y and Z, which are more directional, are similar to pressure gradient microphones oriented along the three orthogonal axes of space. An ambisonic system is a flexible system in the sense that recording and rendering are separate and decoupled. It allows decoding (in the acoustic sense) on any configuration of loudspeakers (for example binaural, 5.1 or 7.1.4 periphonic with elevation "surround" sound). The ambisonic approach may be generalized to more than four channels in B-format, and this generalized representation is commonly called "HOA" (for "Higher-Order Ambisonics").

Decomposing the sound into more spherical harmonics improves the spatial rendering precision when rendering on loudspeakers or on an audio headset.

An Mth-order ambisonic signal comprises $K=(M+1)^2$ components and, in the 1st order (if M=1), there are the four components W, X, Y, and Z, commonly called FOA (for First-Order Ambisonics). There is also what is called a "planar" variant of ambisonics (W, X, Y), which decomposes the sound defined in a plane that is generally the horizontal plane (where Z=0). In this case, the number of components is K=2M+1 channels. 1st-order ambisonics (4 channels: W, X, Y, Z), planar 1st-order ambisonics (3 channels: W, X, Y) and higher-order ambisonics are all referred to below indiscriminately as "ambisonics" for ease of reading, the processing operations that are presented being applicable independently of the planar or non-planar type and the number of ambisonic components.

If, however, it is necessary to draw a distinction in some passages, the terms "1st-order ambisonics" and "planar 1st-order ambisonics" are used.

Various solutions have been proposed for coding ambisonic signals. The simplest approach is that of multi-mono coding, in which each ambisonic component is coded separately by a mono audio encoder. What is of interest in the invention is a particular approach to ambisonic coding that is described in the following publications:

P. Mahé, S. Ragot, S. Marchand, "First-order ambisonic coding with quaternion-based interpolation of PCA rotation matrices," Proc. EAA Spatial Audio Signal Processing Symposium, Paris, France, September 2019, pp. 7-12

P. Mahé, S. Ragot, S. Marchand, "First-Order Ambisonic Coding with PCA Matrixing and Quaternion-Based Interpolation," Proc. DAFx, Birmingham, UK, September 2019.

This approach uses the quantization and interpolation of rotation matrices, as also described in patent application WO2020177981. The strategy of this type of ambisonic coding is that of decorrelating the channels of the ambisonic signal as much as possible and of then coding them separately with a core codec (for example multi-mono). This strategy makes it possible to limit artifacts in the decoded ambisonic signal. More particularly, an optimized decorrelation of the input signals is applied before coding (for example multi-mono).

In this approach, rotation matrices of size 4×4 for the case of FOA in 3D (derived from PCA/KLT analysis as described for example in the patent application cited above) are converted into parameters, for example κ generalized Euler angles or two unit quaternions, which are coded. Moreover, the quaternion domain makes it possible to interpolate the transformation matrices computed for the PCA/KLT analysis rather than having to repeat a decomposition into eigenvalues and eigenvectors multiple times per frame; since the transformation matrices are rotation matrices, upon decoding, the inverse matrixing operation is carried out simply by transposing the matrix applied to the coding.

In this context, there is a need to represent these rotation matrices effectively, which is tantamount, when these rotation matrices are represented by unit quaternions, to finding an effective method for vector quantization on a sphere $\mathbb{S}_3$ in dimension 4.

One alternative approach to PCA coding is that of DiRAC coding (Directional Audio Coding), described for example in the article V. Pulkki, Spatial sound reproduction with directional audio coding, Journal of the Audio Engineering Society, vol. 55, no. 6, pp. 503-516, 2007. In that document, mapping is carried out through directional analysis in order to find a direction (DoA) for each sub-band. This DoA is supplemented by a "diffuseness" parameter, thereby giving a parametric description of the sound scene.

The multi-channel input signal is coded in the form of transport channels (typically a mono or stereo signal obtained by reducing multiple picked-up channels) and spatial metadata (DoA and "diffuseness" for each sub-band).

It will be assumed here that the analysis of the input signal using the DIRAC parametric method is known to a person skilled in the art. The source directions are represented in the form of 3D spherical data, for example in the form of spherical coordinates (azimuth, elevation) in accordance with the geographical convention. In this context, there is a need to represent this DoA information effectively, this being able to be formulated as a vector quantization problem on the sphere $\mathbb{S}_2$ in dimension 3.

In general, any discretization of the sphere $\mathbb{S}_2$ may be used as a spherical vector quantization dictionary. However, without any particular structure, searching for the nearest neighbor and indexing in this dictionary may prove costly to implement when the coding rate of the DoA information is excessively high (for example 16 bits per 3D vector indicating a DoA).

One example of a structured dictionary able to be used to address this problem is given by the quasi-uniform spherical grid described in section 3.2 of the article by Perotin et al., CRNN-based multiple DoA estimation using acoustic intensity features for Ambisonics recordings, IEEE Journal of Selected Topics in Signal Processing, 2019. This grid discretizes elevation and azimuth separately, with a number of levels on the azimuth that depends on the spherical layer associated with each elevation level. This discretization is given for an elevation $\phi$ in [−90, 90] and an azimuth $\theta$ in [−180, 180] in degrees by:

$$\begin{cases} \phi_i = -90 + \frac{i}{I}180, & i = 0, \dots, I \\ \theta_j^i = -180 + \frac{j}{J^i + 1}360, & j = 0, \dots, J^i \end{cases}$$

where $$I = \lfloor 180/\alpha \rfloor \text{ and } J^i = \left\lfloor \frac{360}{\alpha}\cos\phi_i \right\rfloor,$$

and $\alpha$ is an angular resolution (in degrees). This spherical grid is not optimum because the azimuth $\theta_j^i$ always starts at −180 degrees For each elevation index i, this implying that all of the points $(\phi_i, \theta_{j=0}^i)$ are aligned on one and the same meridian. However, in order for a 3D spherical grid to be quasi-optimum, it is desirable for a local distribution of points on the surface of the sphere to be similar to a hexagonal 2D array, this clearly not being satisfied if the points are aligned in this way on a meridian.

Moreover, there is no description in this article of an optimum search for coding using this grid or of any indexing in this grid discretizing the sphere $\mathbb{S}_2$ in dimension 3.

There is therefore a need to improve the methods from the prior art for spherical data quantization.

SUMMARY

The invention aims to improve the prior art.

To this end, the invention targets a method for coding at least one parameter derived from a multichannel signal, represented by an input point on a sphere of dimension n, carried out by coding n−1 spherical coordinates of this input point, the method comprising the following operations:

a) sequential scalar quantization of the n−1 spherical coordinates, defining a spherical grid, comprising the following for a current spherical coordinate to be coded:
   - determining a number of scalar quantization levels for the current spherical coordinate to be coded, on the basis of the previously coded spherical coordinates when the current spherical coordinate to be coded is of index superior to 1;
   - scalar quantization of said current spherical coordinate on the basis of said determined number of levels, with, for n−2 coordinates, determination of 2 closest candidates for the current spherical coordinate to be coded and giving two quantization indices, in order to obtain at most $2^{n-2}$ candidates at the end of the sequential scalar quantization of the n−1 coordinates;

b) selecting the best candidate that minimizes a distance between the input point and the at most $2^{n-2}$ candidates, and determining the separate quantization indices resulting from the sequential scalar quantization of said spherical coordinates of said best candidate;

c) sequential coding of the separate quantization indices of said best candidate.

This quantization method implements an optimum search by taking into account two candidates per spherical coordinate for the sequential coding of the spherical coordinates. This search is optimized in terms of complexity and/or data storage compared to a global exhaustive search. This method provides better performance in particular by providing low quantization errors at a given rate compared to a completely separate quantization of the spherical coordinates without taking into account more than one candidate.

In one embodiment, the two quantization indices given by the determination of two closest candidates, for the current spherical coordinate to be coded, are on the basis of the quantization indices determined for the previous spherical coordinates $(i_1, \dots, i_{k-1})$ when the current spherical coordinate to be coded is of index superior to 1.

In one embodiment, the sequential coding of the separate quantization indices comprises determining a global quantization index by adding at least one item of cardinality information to the quantization index of a spherical coordinate.

A single global index is thus determined and transmitted to the decoder in order to reconstruct the input point, thereby limiting the data to be transmitted.

In one embodiment, the scalar quantization of one of the n−1 spherical coordinates includes a predefined offset.

Such an offset makes it possible to avoid alignment of the decoded points on one and the same “meridian” on the sphere and thus makes it possible to optimize quantization performance.

In one particular embodiment, the number of quantization levels for at least one spherical coordinate is determined on the basis of a total number of points of the spherical grid and of the surface area of a spherical zone of the sphere in dimension n.

This approach makes it possible to further improve the performance of the quantization in terms of data storage since the determination of the number of levels and the indexing resulting therefrom is defined analytically.

In one variant embodiment, an item of cardinality information is determined, for at least one spherical coordinate, on the basis of a number of points of the spherical grid, and of the surface area of a spherical zone of the sphere in dimension n.

It is thus not necessary to store the items of cardinality information in order to carry out the indexing. This is carried out analytically and directly.

In one particular embodiment, for at least one spherical coordinate, the number of levels is forced to an odd value for a number other than 1. This odd number of levels thus makes it possible to have, for example in dimension 3, a colatitude reconstruction level at $\pi/2$ (or in equivalent fashion an elevation reconstruction level at 0), thereby making it possible to represent the horizontal plane for certain 3D audio applications, such as for example applications with artificial ambisonic content in which it is common to have a zero Z component.

The invention also targets a coding method in which the at least one parameter represented by an input point on a sphere of dimension n, with n=4, is at least one unit quaternion representing a rotation matrix used for the coding of the multichannel audio signal.

This coding method is perfectly suited to the coding of these rotation matrices and provides good quantization performance for these matrices.

The invention also targets a coding method in which the at least one parameter represented by an input point on a sphere of dimension n, with n=3, is at least one of items of information about the direction of arrival of audio sources derived from an analysis of the multichannel audio signal. This coding method is perfectly suited to the coding of the items of information about the direction of arrival of audio sources in a 3D representation and provides a good compromise between quantization performance and complexity/storage for the coding and decoding of these items of information.

The invention also targets a coding method in which the at least one parameter represented by an input point on a sphere of dimension n is at least one sub-band with a value of n corresponding to the size of the sub-band of a transformation into frequency sub-bands for the coding of the multichannel audio signal.

The invention also targets a method for decoding at least one parameter derived from a multichannel signal, represented by an input point on a sphere of dimension n, by decoding n−1 spherical coordinates of this input point, the method comprising sequential decoding of the spherical coordinates, defining a spherical grid, based on a global quantization index or on n−1 multiplexed indices, by way of the following operations:

- determining a number of quantization levels for the spherical coordinate to be decoded on the basis of the previously decoded spherical coordinates when the spherical coordinate to be decoded is of index superior to 1;
- determining the separate indices resulting from the separate quantization of said spherical coordinates on the basis of the numbers of levels determined, and then obtaining the corresponding spherical coordinates in order to reconstruct a decoded point on the sphere of dimension n.

This decoding method makes it possible to find a point on the sphere corresponding to the coded input point with good performance, in particular in terms of quantization error.

In one embodiment, the separate indices are determined based on items of cardinality information defined for said spherical coordinates.

This embodiment is applicable in the case where a global quantization index is received.

In one embodiment, the decoding of one of the n−1 spherical coordinates includes a predefined offset.

Indeed, this offset made it possible to optimize quantization performance, and thereby optimizes decoding performance.

In one embodiment, the items of cardinality information are obtained analytically based on a number of points and on the surface area of a spherical zone of the sphere in dimension n.

It is thus not necessary to store the items of cardinality information, thereby optimizing the storage memory and making it possible to find the spherical coordinates in a simple manner.

The invention targets a coding device comprising a processing circuit for implementing the steps of the coding method as described above.

The invention also targets a decoding device comprising a processing circuit for implementing the steps of the decoding method as described above.

The invention relates to a computer program comprising instructions for implementing the coding or decoding methods as described above when they are executed by a processor.

Finally, the invention relates to a storage medium able to be read by a processor and storing a computer program comprising instructions for executing the coding method or the decoding method described above.

BRIEF DESCRIPTION OF THE DRAWINGS

Other features and advantages of the invention will become more clearly apparent on reading the following description of particular embodiments, which are given by way of simple illustrative and non-limiting examples, and the appended drawings, in which.

DETAILED DESCRIPTION OF ILLUSTRATIVE EMBODIMENTS

Figure 1A:
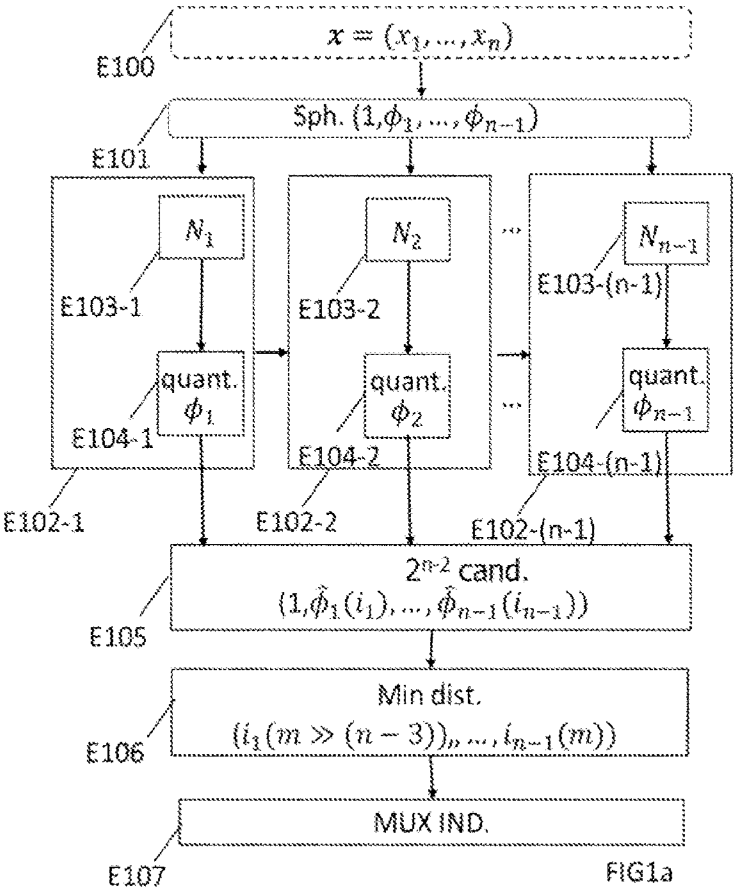
FIG. 1*a* illustrates, in the form of a flowchart, the steps implemented in a coding method according to one general embodiment of the invention.

According to the invention, spherical data are preferably quantized in dimension 3 and 4. However, one general embodiment in dimension n>3 will also be dealt with first.

The case of dimension 3 is applicable by way of example for the coding and the decoding of the DoA directions in coding and decoding, for example of DiRAC type, as described later on with reference to FIGS. 4 and 5. The case of dimension 4 is used for the quantization of matrices of dimension 3 and 4 in the domain of (unit) quaternions and (unit) dual quaternions, respectively, for example for ambisonic coding and decoding based on principal component analysis, as described later on with reference to FIGS. 6 and 7. The case of a dimension n>4 is applied, by way of exemplary embodiment, to the coding of sub-bands in an audio codec based on a mono transform.

The coding method for a dimension n is now described with reference to FIG. 1*a*.

Consideration will be given here to the general case of spherical data $x=(x_1, \ldots, x_n)\in\mathbb{R}^n$. According to the invention, the coding may be applied with an input x defined with Cartesian coordinates in step E100 or directly in the form of spherical coordinates $(r, \phi_1, \ldots, \phi_{n-1})$ in step E101. Consideration will be given here, without loss of generality, to a mathematical definition in step E101:

$$x_1 = r\cos\phi_1,$$

$$x_2 = r\sin\phi_1\cos\phi_2$$

$$\ldots$$

$$x_{n-1} = r\sin\phi_1\sin\phi_2\ldots\cos\phi_{n-1}$$

$$x_n = r\sin\phi_1\sin\phi_2\ldots\sin\phi_{n-1}$$

In some variants, other spherical coordinate systems will be possible. The angles here—unless specified otherwise—are defined in radians; in some variants, another unit may be used (for example degrees).

The radius r is considered hereinbelow to be unitary (r=1) and the spherical coordinates are to be understood in the sense of the angular coordinates $\phi_1, \ldots, \phi_{n-1}$. However, in some variants, it would be possible to code this radius r separately in order to obtain a gain-shape quantization, the shape being coded according to the invention and the radius being coded separately based on conventional methods that are not within the scope of the invention (for example scalar quantization followed by entropy coding).

Hereinafter, the term "grid" or "spherical grid" will be used to denote a spherical vector quantization dictionary that discretizes the sphere $\mathbb{S}_{n-1}$. According to the invention, the grid is defined implicitly by the sequential quantization of spherical coordinates.

According to the invention, the spherical data at the input of the coding are represented by a quasi-uniform discretization (here in the sense of the uniformity of the area of the decision regions and/or of the distribution of the points) of the sphere $\mathbb{S}_{n-1}$. The grid is defined by a sequential scalar quantization of the coordinates $\phi_1, \ldots, \phi_{n-1}$.

This constraint makes it possible to divide the coding steps according to the spherical coordinates, by first coding $\phi_1$ in step E102-1, then $\phi_2$ in step E102-2, . . . , and finally $\phi_{-1}$ in step E102-(n−1). According to the invention, this sequential approach is equivalent to an exhaustive search for the nearest neighbor in the complete spherical grid, because steps E102-1 to E102-(n−2) give two candidates (the two points closest to $\phi_k$), this being tantamount to implicitly defining a binary search tree with $2^{n-2}$ candidates (leaves) at the end of step E102-(n−1). It may be checked that this binary tree allows an optimum search.

The principle of each step E102-*k* is the same, taking into account the fact that the angles $\phi_1, \ldots, \phi_{n-2}$ have a support of width π while $\phi_{n-1}$ has a support of width 2π.

A uniform scalar quantization with the same step of each angle $\phi_k$, k=1, . . . , n−1 would give a "lat-long"-type grid in which the distribution of points is not uniform—for example, in the 3D case, there would be points that get closer and closer in the proximity of the poles, with the aberration where the azimuth would be coded at the North and South poles if the coding of the elevation (or colatitude) includes reconstruction levels representing the poles. Thus, according to the invention, use is made instead of a grid with a number of scalar quantization levels $N_k$ dependent on the spherical coordinate $\phi_k$ and the coded values $\hat{\phi}_1, \hat{\phi}_2, \ldots$ of the previous coordinates. According to the variants, the number $N_1\geq 1$ of scalar quantization levels for the first spherical coordinate is predetermined in line with various approaches in step E103-1, either directly by setting a predetermined integer value $N_1$ or by way of an angular resolution α. In general, the values of $N_k$ (including the value of $N_1$) will be set so as to satisfy an allocated rate constraint not to be exceeded for the spherical vector quantization.

In the preferred embodiment, preference will be given to a scalar quantization the dictionary of which includes the values $\phi_1=0$, π/2 and π as reconstruction levels, thereby giving an odd number $N_1$, so as to include the poles ($\phi_1=0$, π) and the "equator" ($\phi_1=\pi/2$) among the coded values. The numbers $N_2, \ldots, N_{n-1}$ are deduced in such a way that the grid is quasi-uniform. The following may thus be adopted, for example:

$$N_1 = 2\left[\frac{90}{\alpha}\right] + 1$$

where α is given in degrees (for example α=2 degrees). In some variants, other methods for determining the integer value $N_1$ will be possible.

The scalar quantization dictionary for the coordinate $\phi_1$ is preferentially given by the set of reconstruction values (or codewords):

$$\hat{\phi}_1(i) = \frac{i}{N_1 - 1}\pi,\ i = 0, \ldots, N_1 - 1$$

this corresponding to a uniform scalar quantization on [0, π] to $N_1$ levels. In some variants, other (uniform or non-uniform) scalar quantization dictionaries will be possible, including dictionaries that do not include the poles ($\phi_1=0$ and π). The principle of determining $N_k$, k>1 is based on the (infinitesimal) elementary surface area on the sphere $\mathbb{S}_{n-1}$, which is given by $$dA = r^{n-1}\sin^{n-2}\phi_1\sin^{n-3}\phi_3\ldots\sin\phi_{n-2}\,d\phi_1\,d\phi_2\ldots d\phi_{n-2}\,d\phi_{n-1}$$

which may be rewritten, assuming r=1, as follows:

$$dA = d\phi_1(\sin\phi_1 d\phi_2)(\sin\phi_1\sin\phi_2 d\phi_3)\ldots(\sin\phi_1\sin\phi_2\ldots\sin\phi_{n-2}d\phi_{n-1})$$

This will thus give for example $N_k$ given in the general form in step E103-2, . . . , E103-(n−1):

$$N_k(i_1, i_2, \ldots, i_{k-1}) = \max\left(1, \left[\sin\hat{\phi}_1(i_1)\sin\hat{\phi}_2(i_1, i_2)\ldots\sin\hat{\phi}_{k-1}(i_1, \ldots, i_{k-1})\right)\frac{180}{\alpha}\right]\Big), k = 2, \ldots, n-2$$

$$N_{n-1}(i_1, i_2, \ldots, i_{n-2}) = \max\left(1, \left[\sin\hat{\phi}_1(i_1)\sin\hat{\phi}_2(i_1, i_2)\ldots\sin\hat{\phi}_{n-2}(i_1, \ldots, i_{n-2})\right)\frac{360}{\alpha}\right]\Big)$$

where the indices $i_k$ are the scalar quantization indices of the coordinate $\phi_k$ that are obtained in step E104-*k* and $\{\hat{\phi}_k(i_k), i_k=0, \ldots, N_k(i_1, i_2, \ldots, i_{k-1})-1\}$ is the predefined scalar quantization dictionary, which is based on the coordinates previously coded and represented by the respective indices $i_1, i_2, \ldots, i_{k-1}$.

The scalar quantization dictionary for the coordinate $\phi_k$, k=1, . . . ,n−1, is preferably given by:

$$\hat{\phi}_k(i_1, i_2, \ldots, i_{k-2}) = \frac{i}{N_k(i_1, i_2, \ldots, i_{k-1}) - 1}\pi,$$

$$i = 0, \ldots, N_k(i_1, i_2, \ldots, i_{k-2}) - 1$$

and $$\hat{\phi}_{n-1}(i_1, i_2, \ldots, i_{n-2}, i) = \frac{i}{N_{n-1}(i_1, i_2, \ldots, i_{n-2})}2\pi,$$

$$i = 0, \ldots, N_{n-1}(i_1, i_2, \ldots, i_{n-2}) - 1$$

this corresponding to a uniform scalar quantization on respectively $N_k$ levels over $[0, \pi]$ and $N_{n-1}$ levels over $[0, 2\pi]$. In the case of $\hat{\phi}_{n-1}(i)$, it should be noted that the redundant bounds 0 and $2\pi$ are not repeated due to the circular nature of these coordinates (in other words, because of the modulo $2\pi$). In some variants, other scalar quantization dictionaries will be possible.

The total number of points in the grid discretizing the sphere $\mathbb{S}_{n-1}$ is given by:

$$N_{tot} = \sum_{i_1=0}^{N_1-1}\sum_{i_2=0}^{N_2(i_1)-1} \ldots \sum_{i_{n-2}=0}^{N_{n-2}(i_1, i_2, \ldots, i_{n-2})-1} N_{n-1}(i_1, i_2, \ldots, i_{n-2})$$

The spherical grid is therefore defined as the following spherical vector quantization dictionary:

$$\{(1, \hat{\phi}_1(i_1), \ldots, \hat{\phi}_{n-1}(i_{n-1})) \mid i_1 = 0, \ldots, N_1 - 1; \ldots ; i_{n-1} = 0, \ldots, N_{n-1}(i_1, i_2, \ldots, i_{n-1}) - 1\} \quad \text{(i1)}$$

The n−1 spherical coordinates are quantized sequentially from step E104-1 to step E104-(n−1). Given the value of $\phi_k$ resulting from step E101 and the value $N_k$ resulting from step E103-*k*, step E104-*k* consists in quantizing the coordinate $\phi_k$ with a predetermined dictionary with $N_k(i_1, i_2, \ldots, i_{k-1})$ levels so as to retain two quantization indices corresponding to the two closest candidates. Thus, in step E104-1, two indices $i_1(0)$ and $i_1(1)$ corresponding to the two points of the dictionary $\{\hat{\phi}_1(i_1), i_1=0, \ldots, N_1-1\}$ that are closest to $\phi_1$ are retained, such that:

$$i_1(0) = \arg\min_{i=0,\ldots,N_1-1}\left(\phi_1 - \hat{\phi}_1(i)\right)^2$$

$$i_1(0) = \arg\min_{\substack{i=0,\ldots,N_1-1\\ i\neq i_1(0)}}\left(\phi_1 - \hat{\phi}_1(i)\right)^2$$

It should be noted that the indices $i_1(0)$ and $i_1(1)$ may be swapped without this changing the optimum result at the end of the sequential coding.

In step E104-2, two indices $i_2(2i_1(j))$ and $i_2(2i_1(j)+1)$ corresponding to the two points of the dictionary $\{\hat{\phi}_2(l), l=0, \ldots, N_2(i_1(j))-1\}$ that are closest to $\phi_2$ for each of the two candidates $i_1(0)$ and $i_1(1)$ retained in step E-104-1 are retained, thereby giving 4 indices $i_2(0)$, $i_2(1)$ and $i_2(2)$, $i_2(3)$, such that:

$$i_2(0) = \arg\min_{i=0,\ldots,N_2(i1)-1}\left(\phi_2 - \hat{\phi}_2(i_1(0), i)\right)^2$$

$$i_2(1) = \arg\min_{\substack{i=0,\ldots,N_2(i1)-1\\ j\neq i_2(0)}}\left(\phi_2 - \hat{\phi}_2(i_1(0), i)\right)^2$$

and $$i_2(2) = \arg\min_{i=0,\ldots,N_2(i2)-1}\left(\phi_2 - \hat{\phi}_2(i_1(1), i)\right)^2$$

$$i_2(3) = \arg\min_{\substack{i=0,\ldots,N_2(i2)-1\\ j\neq i_2(2)}}\left(\phi_2 - \hat{\phi}_2(i_1(1), i)\right)^2$$

It should be noted that the indices $i_2(0)$ to $i_1$ (3) may be permuted without this changing the result of the optimum candidate at the end of the coding.

Finally, in step E104-(n−1), only the nearest neighbor is retained for coding $\phi_{n-1}$, and this step is repeated for the $2^{n-2}$ combinations of indices resulting from the previous n−2 coordinates.

An implicit binary tree is thus obtained with twice the number of "candidates" in each step up to step n−2, so as to arrive at $2^{n-2}$ possible combinations of coded values, and therefore as many combinations of indices in step E104-(n−1).

This tree is presented here by way of a combination index $m=0, \ldots, 2^{n-2}-1$ at the level of the leaves of the binary tree, at the end of step E104-(n−1).

For a given value of m, the corresponding separate quantization indices are:

$$i_1(m \gg (n-3)), i_2(m \gg (n-4)), \ldots, i_{n-1}(m)$$

where the operator b>>n corresponds to a binary shift of the integer value b (in binary representation) by n bits to the right—in other words, b>>n gives the quotient of the integer division of b by $2^n$. Thus, m>>(n−3) takes only two values, 0 or 1, for $i_1$, m>>(n−4) takes 4 possible values (from 0 to 3) for $i_2$, etc.

This therefore gives, in step E105, a number of $2^{n-2}$ candidates $(1, \hat{\phi}_1(i_1(m{>>}(n-3))), \ldots, \hat{\phi}_{n-1}(i_{n-1}(m)))$, which may also be abbreviated in the form $(1, \hat{\phi}_1(m), \ldots, \hat{\phi}_{n-1}(m))$ with $m=0, \ldots, 2^{n-2}-1$. Step E106 selects the candidate closest to the input point, either in the domain of the Cartesian coordinates, having converted each candidate $(1, \hat{\phi}_1(i_1(m{>>}(n-3))), \ldots, \hat{\phi}_{n-1}(i_{n-1}(m)))$ to Cartesian and minimizing a distance with $x=(x_1, \ldots, x_n)$, or in the domain of the spherical coordinates with a predetermined distance, which is preferably the angular distance.

In the case of Cartesian coordinates, step E106 converts the spherical coordinates in $(1, \hat{\phi}_1(m), \ldots, \hat{\phi}_{n-1}(m)))$ into Cartesian coordinates $\hat{x}(m)=(\hat{x}_1(m), \ldots, \hat{x}_n(m))$, and the optimum combination of separate indices is selected as:

$$m^* = \hat{x} = \arg\min_{m=0,\ldots,2^{n-2}-1} \|x - \hat{x}(m)\|^2 = \arg\min_{m=0,\ldots,2^{n-2}-1} \sum_{i=1}^{n} (x_i - \hat{x}_i(m))^2,$$

here for a squared error criterion between the input point $x=(x_1, \ldots, x_n)$ and each candidate $\hat{x}(m)=(\hat{x}_1(m), \ldots, \hat{x}_n(m))$. In some variants, distance criteria other than the squared error may be used. It is also possible, in a fashion equivalent to a squared error, to maximize the scalar product:

$$m^* = \arg\max_{m=0,\ldots,2^{n-2}-1} \sum_{i=1}^{n} x_i \cdot \hat{x}_i(m)$$

since $\|x-\hat{x}(m)\|^2=\|x\|^2+\|(m)\|^2-2<x,\hat{x}(m)>=2-2<x,\hat{x}(m)>$, where $<.,.>$ is the scalar product, the points x and $\hat{x}(m)$ being on a unit sphere.

In the case of spherical coordinates, it is possible to use the angular distance, which is given as the arccosine of the scalar product of $x=(x_1, \ldots, x_n)$ and $(\hat{x}_1(m), \ldots, \hat{x}_n(m))$. Since the arccosine does not modify the optimum, it is possible to use a modified angular distance that is simply reduced to the scalar product expressed in the domain of the spherical coordinates. For the dimension n=3, this distance is known to be—here for colatitude:

$$dist_{ang}\left((\phi_1, \phi_2), (\hat{\phi}_1(m), \hat{\phi}_2(m))\right) = \arccos\left(\cos\phi_1 \cos\hat{\phi}_1(m) + \sin\phi_1 \sin\hat{\phi}_1(m)\cos\left(\phi_2 - \hat{\phi}_2(m)\right)\right),$$

which is adapted easily for elevation:

This criterion gives, in E106:

$$m^* = \arg\max_{m=0,\ldots,2^{n-2}-1} \cos\phi_1 \cos\hat{\phi}_1(m) + \sin\phi_1 \sin\hat{\phi}_1(m)\cos\left(\phi_2 - \hat{\phi}_2(m)\right)$$

This example of angular distance simplified as a scalar product for n=3 may be generalized to higher dimensions.

This thus gives the index m* of the optimum coded point that corresponds to the corresponding sequence of separate quantization indices $(i_1(m^*>>(n-3)), \ldots, i_{n-1}(m^*))$ associated with the sequential coding of each spherical coordinate.

This combination of indices $i_1, \ldots, i_{n-1}$ (in abbreviated form) is converted into a bit string in step E107, either in the form of a global and single index index or in the form of coding and/or multiplexing of the separate quantization indices.

In a first embodiment, according to the invention, this index is generally obtained in the following form:

$$\text{index} = \text{offset}_1(i_1) + \text{offset}_2(i_1, i_2) + \ldots + \text{offset}_{n-2}(i_1, i_2, \ldots, i_{n-2}) + i_{n-1}$$

where $\text{offset}_k(.)$ represents an item of cardinality information for the kth coordinate, in the form of a cumulative cardinality sum corresponding to the cumulative sum—starting from the "North pole"—of the number of points of the grid to the "spherical zone" defined by the coded value of the kth coordinate.

The global index index is thus obtained by sequential coding of the separate quantization indices $i_1, i_2, \ldots, i_{n-1}$ of the best candidate.

In some variants, the last term of the sum $(i_{n-1})$ may be permuted, so as to have:

$$\text{index} = \text{offset}_1(i_1) + \text{offset}_2(i_1, i_2) + \ldots + \text{offset}_{n-2}(i_1, i_2, \ldots, i_{n-2}) + p(i_{n-1})$$

where p(.) is a permutation of the integers in $\{0, 1, \ldots, N_{n-1}(i_1, i_2, \ldots, i_{n-2})-1\}$. Without loss of generality, the case in which p(i)=i will be discussed hereinafter.

By definition, $\text{offset}_1(0)=0$ and $$\text{offset}_1(i+1) = \sum_{i_1=0}^{i} \sum_{i_2=0}^{N_2(i_1)-1} \ldots \sum_{i_{n-2}=0}^{N_{n-2}(i_1,i_2,\ldots,i_{n-2})} N_{n-1}(i_1, i_2, \ldots, i_{n-2})$$

for $i=0, \ldots, N_1-1$. The items of cardinality information may be extended with the convention $\text{offset}_1(N_1)=N_{tot}$, this being useful for decoding.

Likewise, $\text{offset}_2(i_1, 0)=0$ and $$\text{offset}_2(i_1, i+1) = \sum_{i_2=0}^{i} \ldots \sum_{i_{n-2}=0}^{N_{n-2}(i_1,i_2,\ldots,i_{n-2})-1} N_{n-1}(i_1, i_2, \ldots, i_{n-2})$$

This definition may be easily generalized for the other values $\text{offset}_k(.)$.

In some variants, other methods will be possible, in particular by changing the starting point (North pole, South pole, equator) and/or the order of the indices for each summing operation on $i_1, i_2, \ldots$ of the cumulative cardinality sums $\text{offset}_k(.)$.

In a second embodiment, according to the invention, the number of levels $N_k(i_1, i_2, \ldots, i_{k-1})$, $k=2, \ldots, n-1$ in step E103-*k* and the items of cardinality information $\text{offset}_k(i_1, i_2, \ldots, i_k)$, $k=1, \ldots, n-2$ in step E107 are obtained analytically based on the surface area of spherical zones of the sphere $\mathbb{S}_{n-1}$ and on a total number of points, which corresponds for example to the total number $N_{tot}$ of the spherical grid for the first coordinate $\phi_1$; some exemplary embodiments of this analytical approach are detailed below for the dimensions n=3 and 4. These examples may be generalized to the dimension n. In this case too, the global index index is obtained by sequential coding of the separate quantization indices $i_1, i_2, \ldots, i_{n-1}$ of the best candidate.

In a third embodiment, step E107 consists in sequentially coding, in binary form, the n−1 indices $i_1(m^*>>(n-3)), \ldots, i_{n-1}(m^*)$ corresponding to the best candidate. This coding is sequential because the number of possible values $(N_k)$ for each index depends on the previous indices. This third embodiment is particularly beneficial for high dimensions because the use of cardinality of the type $\text{offset}_k(.)$ is relevant in dimension 3, more complicated in dimension 4, and it becomes even more complex to implement in dimensions higher than 4.

In a first variant, this sequential coding will use fixed-rate binary coding for the indices $i_1, \ldots, i_{n-1}$ on respectively $\lceil \log_2 N_1 \rceil$ bits, $\ldots, \lceil \log_2 N_{n-1}(i_1, i_2, \ldots, i_{n-2}) \rceil$ bits, where $\lceil . \rceil$ denotes the rounding to the higher integer, with the convention ⌈0⌉=0. The multiplexing is therefore carried out sequentially so as to form a bit string of variable total bit length $\lceil \log_2 N_1 \rceil + \ldots + \ldots, \lceil \log_2 N_{n-1}(i_1, i_2, \ldots, i_{n-2}) \rceil$, by first multiplexing $i_1$ and then $i_2$ and so on up to $i_{n-1}$. It should be noted that, when $N_k=1$, the coding takes 0 bits for the index $i_k$.

In a second variant, the indices will be coded sequentially with Huffman entropy coding or arithmetic coding. It is possible to use an estimate of the probability of each value (symbol) $i_k$ between 0 and $N_k-1$, where $N_k$ in abbreviated notation denotes $N_k(i_1, i_2, \ldots, i_{k-1})$, by determining the partial surface area of the sphere in the "spherical slice" associated with $i_k$ for the coordinate $\phi_k$ (where applicable conditionally with the indices $i_1, i_2 \ldots, i_{k-1}$), this area being normalized by the total area of the sphere for the coordinate $\phi_1$ and by the total area of the sphere part brought about by the indices $i_1, i_2 \ldots, i_{k-1}$ for the coordinates $\phi_k$, k=1, . . . , n−2. Here, the term "spherical slice" is understood to mean the spherical zone brought about for the coordinate $\phi_k$ and delimited by the decision thresholds corresponding to the codeword of index $i_k$.

In general, for the coordinate $\phi_{n-1}$, it is possible simply to use binary coding with a fixed length on $\lceil \log_2 N_{n-1}(i_1, i_2, \ldots, i_{n-2}) \rceil$ bits, assuming an equiprobable distribution.

In some variants, other probability estimates will be possible if the distribution of the source on the sphere in dimension 3 is assumed to be non-uniform.

The corresponding decoding method, for a dimension n, is described with reference to FIG. 1*b*.

Given the global index in step E110, sequential decoding of the spherical coordinates is carried out from step E111-1 to step E111-(n−1) in line with an approach similar to the coding.

In step E112-1, as in coding step E103-1, a number of scalar quantization levels $N_1$ is determined. The index $i_1$ is determined in step E113-1 in order to decode the value $\phi_1(i_1)$ in step E114-1.

In the first embodiment, the determination of $i_1$ is based on the comparison of the value index with a set of integer values $\text{offset}_1(i_1)$ in which $\text{offset}_1(i_1)$ corresponds to a cumulative cardinality sum for the first spherical coordinate, as defined above for the coding with reference to FIG. 1*a*.

The simplest embodiment for decoding $i_1$ consists of an iterative search.

For an index to be decoded $0 \leq \text{index} < N_{tot}$, $i_1$ is decoded starting with $i_1=0$ and successively incrementing $i_1 \leftarrow i_1+1$ as long as $\text{offset}_1(i_1+1) > \text{index}$. Indeed, the value of $\text{offset}_1(i_1)$ corresponds to the cumulative sum of the cardinalities (number of points) of each of the "horizontal slices" of the sphere, going from the first slice of index 0 to the current slice of index $i_1$ (exclusively).

In a second embodiment, $i_1$ is determined analytically. The exact determination depends on the dimension n. Some exemplary embodiments for dimension 3 and 4 are described below.

In step E113-1, the value of $\text{offset}_1(i_1)$ is subtracted from index:

$$\text{index} \leftarrow \text{index} - \text{offset}_1(i_1)$$

In step E112-2, as in step E103-2, a number of scalar quantization levels $N_2(i_1)$ is determined, and then the index $i_2$ is determined in step E113-2 by successively comparing the value index (updated in step E113-1) with $\text{offset}_2(i_1, i_2)$ corresponding to a cumulative cardinality sum for the second spherical coordinate, by successively incrementing the value of $i_2$ as long as $\text{offset}_2(i_1, i_2+1) > \text{index}$ in the first embodiment or analytically in the second embodiment. This gives the value $\hat{\phi}_2(i_2)$ in step E114-2. In step E113-2, the value of $\text{offset}_2(i_1, i_2)$ is subtracted from index:

$$\text{index} \leftarrow \text{index} - \text{offset}_2(i_1, i_2)$$

The decoding proceeds in this way up to the last coordinate in order to obtain the quantization index $i_{n-1}$ corresponding to the coordinate $\phi_{n-1}$ by subtracting $\text{offset}_{n-1}(i_1, i_2, \ldots, i_{n-2})$ from the updated value of index, and to decode the value $\hat{\phi}_{n-1}(i_{n-1})$ in step E114-(n−1).

This thus gives the decoded point in step E115 as $(1, \hat{\phi}_1(i_1), \ldots, \hat{\phi}_{n-1}(i_{n-1}))$, or, as a Cartesian datum in E116, the point $\hat{x}=(\hat{x}_1, \ldots, \hat{x}_n)$.

In some variants, it will be possible to reduce the maximum complexity of the decoding of the indices $i_1, i_2 \ldots$ for example with a dichotomy search starting in the middle of the table $\text{offset}_k(.)$ and then by halving the search interval to the left or to the right depending on the comparison result—the result is the same but the maximum computational complexity is reduced with approximately $\log_2 N_1$ comparisons instead of $N_1$ comparisons.

In a second embodiment, the number of points $N_k(i_1, i_2, \ldots, i_{k-1})$, k=2, . . . , n−1 in step E112-*k* and the items of cardinality information $\text{offset}_k(i_1, i_2, \ldots, i_k)$, k=1, . . . , n−2 in step E113-*k* are obtained analytically based on a number of points $N_{tot}$ and on the surface area of a spherical zone of the sphere in dimension n. Some exemplary embodiments are detailed below for dimensions n=3 and 4. The values $\text{offset}_k(.)$ will be determined analytically—without being stored—by determining the relative surface area of spherical zones as detailed with reference to FIGS. 2 and 3.

In a third embodiment, step E110 consists in demultiplexing and sequentially decoding the n−1 separate scalar quantization indices $i_1(m^* \gg (n-3)), \ldots, i_{n-1}(m^*)$. This decoding is sequential because the number of possible values ($N_k$) for each index depends on the previous indices. In a first variant, this demultiplexing and sequential decoding will use fixed-rate binary decoding for the index $i_1, \ldots, i_{n-1}$ on respectively $\lceil \log_2 N_1 \rceil$ bits, . . . , $\lceil \log_2 N_{n-1}(i_1, i_2, \ldots, i_{n-2}) \rceil$ bits, where ⌈.⌉ denotes the rounding to the higher integer, with the convention ⌈0⌉=0. The demultiplexing therefore takes place sequentially in order to read a bit string of variable total bit length $\lceil \log_2 N_1 \rceil + \ldots + \lceil \log_2 N_{n-1}(i_1, i_2, \ldots, i_{n-2}) \rceil$. The demultiplexing is sequential because $i_1$ is first of all demultiplexed, thereby making it possible to determine $N_2(i_1)$, and this information is given to the demultiplexing in order to be able to demultiplex $i_2$, etc.

In a second variant, the indices will be demultiplexed and decoded sequentially with Huffman entropy decoding or arithmetic decoding. It is possible to use an estimate of the probability of each value (symbol) $i_k$ between 0 and $N_k-1$ (in abbreviated notation) by determining the partial surface area of the sphere in the slice associated with $i_k$ for the coordinate $\phi_k$ (where applicable conditionally with the indices $i_1, i_2 \ldots, i_{k-1}$), this area being normalized by the total area of the sphere for the coordinate $\phi_1$ and by the total area of the sphere part brought about by the indices $i_1, i_2 \ldots, i_{k-1}$ for the coordinates $\phi_k$, k=1, . . . , n−2.

In general, for the coordinate $\phi_{n-1}$, it is possible simply to demultiplex a fixed-length code on $\lceil \log_2 N_{n-1}(i_1, i_2, \ldots, i_{n-2}) \rceil$ bits, assuming an equiprobable distribution.

In some variants, other probability estimates will be possible if the distribution of the source on the sphere in dimension 3 is assumed to be non-uniform.

Figure 2A:
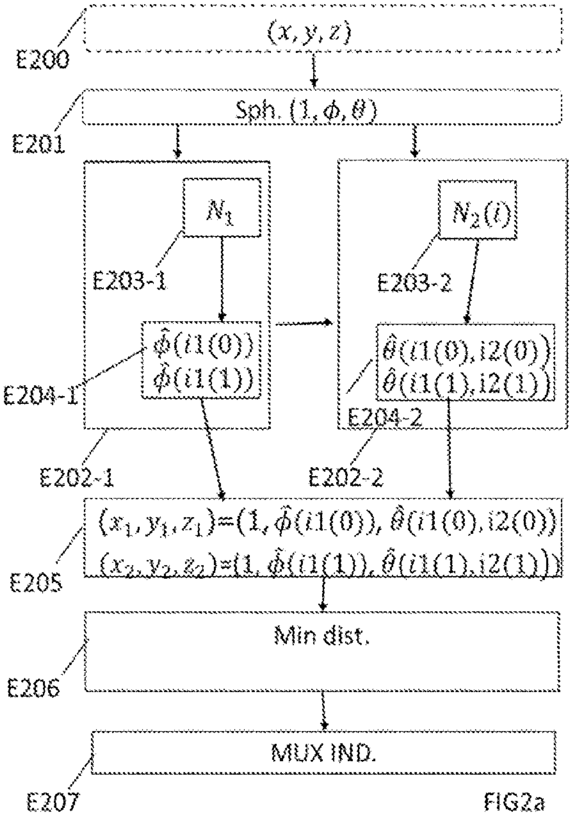
FIG. 2*a* illustrates, in the form of a flowchart, the steps implemented in a coding method according to one embodiment, in dimension 3, of the invention.
Figure 2B:
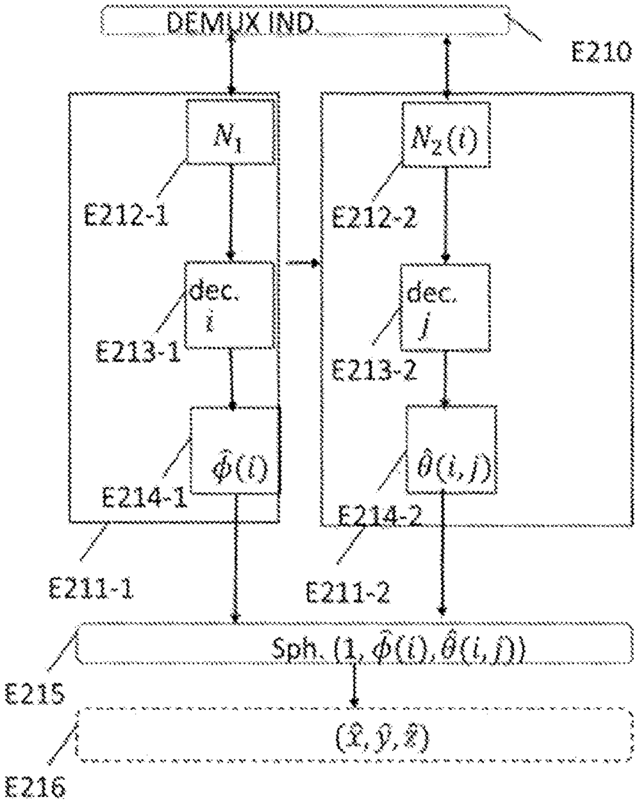
FIG. 2*b* illustrates, in the form of a flowchart, the steps implemented in a decoding method according to one embodiment, in dimension 3, of the invention.

FIGS. 2*a* and 2*b* are now described in order to illustrate, first of all, the case of 3D quantization, in which n=3.

Without loss of generality, the definition of spherical coordinates in 3D in line with the physical convention that is often used in the field of acoustics and 3D audio will be adopted here. The radius, which is here set to 1, will be omitted here, keeping only the azimuth and the colatitude (or the elevation in some variants) in the case of coding a direction of sources (or DoA), as in a DiRAC scheme.

In some variants and for certain applications (for example quantization of a sub-band in transform-based coding), it will be possible to code a radius separately (corresponding to a mean amplitude level per sub-band for example).

FIG. 2*a* describes a method for coding an input point on a sphere of dimension 3.

The components (x,y,z) of a 3D Cartesian vector (input point of step E200) are converted into spherical coordinates (r, ϕ, θ) in E201. In this step E201, a conversion of the spherical coordinates is optionally carried out, for example in order to convert an elevation and an azimuth in degrees to a colatitude and an azimuth in radians.

In the preferred embodiment, the angles ϕ, θ correspond respectively to the colatitude and the azimuth, which does not correspond to the angles $\phi_1$ and $\phi_2$ defined with reference to FIG. 1 for the case of dimension n=3, because in this dimension the physical interpretation of the North and South poles (ϕ=0 and π respectively) is important.

Hereinafter, the 3D point may be indiscriminately denoted (x,y,z), (r, ϕ, θ) or (ϕ, θ) when the point is on the unit sphere (r=1).

Without loss of generality, the angles to be coded are defined in radians-however, the resolution parameter a used in some variants is given in degrees For ease of understanding thereof. In some variants, the various embodiments may use another unit, for example degrees, for the angles to be coded. In some variants, the colatitude (defined based on the axis Oz) may be replaced with an elevation (defined based on the horizontal plane Oxy), and other equivalent spherical coordinate systems (obtained for example by permuting or inverting Cartesian coordinates) may be used according to the invention—it will be sufficient to apply the necessary conversions in the definition of the scalar quantization dictionaries, the number of levels, etc. The coding and the decoding according to the invention is applicable to all definitions of spherical coordinates, and it is thus possible to replace ϕ, θ with other spherical coordinates by adapting the conversion between Cartesian coordinates and spherical coordinates.

According to the invention, the input spherical data on the sphere $\mathbb{S}_2$ are represented by a quasi-uniform discretization (here in the sense of the uniformity of the area of the decision regions and of the distribution of the points) of the sphere $\mathbb{S}_2$. The grid (or spherical vector quantization dictionary) is thus defined by a sequential scalar quantization of the spherical coordinates ϕ, θ, in the sense that a first coordinate ϕ is discretized by scalar quantization, and then a second coordinate θ is discretized conditionally on the basis of the coded value of the first coordinate.

Without loss of generality, the angles ϕ, θ will be defined in radians. In some variants, a unit other than radians, for example degrees, may be used.

Multiple types and variants of the spherical grids are defined according to the invention. They all have the common feature of sequentially discretizing the colatitude and then the azimuth by scalar quantization, with a uniform discretization of the azimuth according to a number of levels depending on the coded value of the colatitude.

The coordinates ϕ and then θ are sequentially coded, with a predetermined scalar quantization dictionary $\{\hat{\phi}(i), i=0, \ldots, N_1-1\}$ with $N_1$ levels for ϕ and a set of predetermined uniform scalar quantization dictionaries $\{\hat{\theta}(i, j), j=0, \ldots, N_2(i)-1\}$ with $N_2(i)$ levels for θ on the basis of the index i of the coded colatitude. It is therefore possible to see each of the variants of the 3D grids according to the invention as a set of discretized "spherical zones" or "horizontal slices" brought about by the quantization of the colatitude (the limits of each slice are given by the decision thresholds for the quantization of the colatitude, excluding poles), these slices then being themselves divided into "regions" that are distributed equally in terms of azimuth with a number of "regions" depending on the colatitude slice. The total number of points of the sphere discretized according to the various numbers of levels determined, also called the total number of points in the 3D grid, is in all cases:

$$N_{tot} = \sum_{i=0}^{N_1-1} N_2(i)$$

The spherical grid is therefore defined as the following spherical vector quantization dictionary:

$$\{(1, \hat{\phi}(i), \hat{\theta}(i, j)) \mid i = 0, \ldots, N_1-1; j = 0, \ldots, N_2(i)-1\}$$

If the coding were to be carried out in a totally separate manner (and not sequentially as in the invention) with independence of the coding of ϕ and then θ, the search for the nearest neighbor in the grid would correspond to a division of the sphere into "spherical rectangles"; according to the invention, however, provision is preferably made to carry out sequential coding in which two candidates are retained for colatitude, thereby changing the shape of the decision regions with, in general, a majority of "decision regions" in the shape of a hexagon, and an optimum result equivalent to an exhaustive search.

As described below, the coding algorithm (specifically, for searching for the nearest neighbor) and decoding algorithm ("inverse" quantization) is common to all grid types; on the other hand, the determination of the global index (indexing) and the decoding of the global index depend on the embodiment.

The type of scalar quantization dictionary used to code colatitude may be uniform (with or without poles) or non-uniform.

Figure 1B:
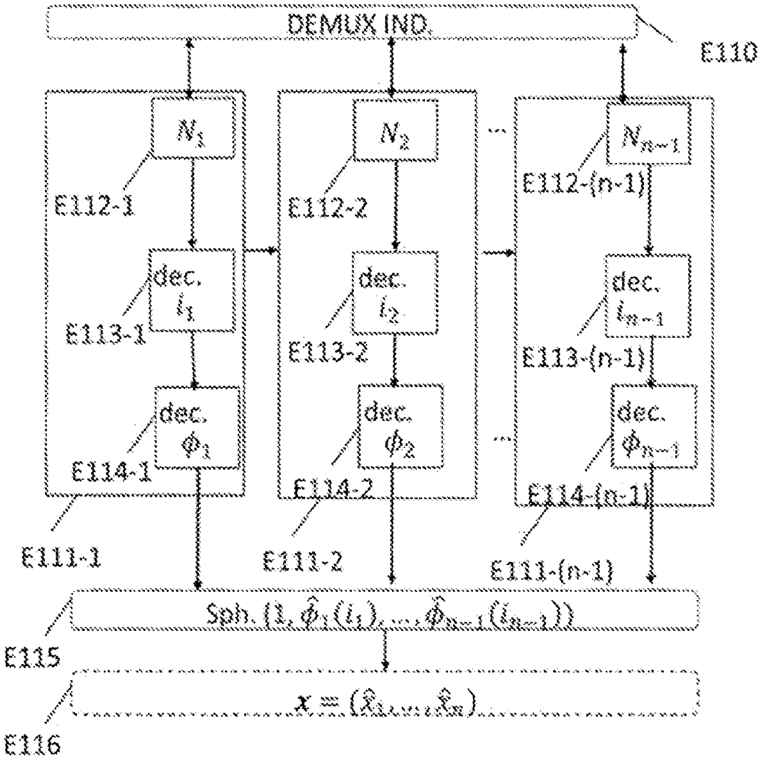
FIG. 1*b* illustrates, in the form of a flowchart, the steps implemented in a decoding method according to one general embodiment of the invention.

Three embodiments are defined, as in the general case described in FIGS. 1*a* and 1*b*. It should be noted that, in the second embodiment, the grid is defined specifically so as to simplify the step of determining the global quantization index (indexing) that takes place without storing the items of cardinality information. In this case, the number of levels for the coding of the azimuth and the items of cardinality information necessary for the indexing are obtained analytically based on the partial surface area of the sphere $\mathbb{S}_2$ and on the total number of points $N_{tot}$.

In a first embodiment, the grid is defined for example based on an angular resolution a (in degrees For ease of understanding thereof) as follows.

In 202-1, the colatitude is coded by scalar quantization on $N_1$ reconstruction levels. Preferably, a uniform scalar quantization over the interval [0, π] is used (including the values 0, π/2 and π as reconstruction levels):

$$\hat{\phi}(i) = \frac{i}{N_1-1}\pi, \; i = 0, \ldots, N_1-1$$

where $N_1$ is defined in E203-1 by $$N_1 = 2\left[\frac{90}{\alpha}\right] + 1$$

so as to have an odd number of levels $N_1$ (and therefore include the North and South poles and the equator) and [.] is the rounding to the nearest integer. This constraint of an odd number of levels, so as to specifically have a reconstruction level equal to $\pi/2$ in the scalar quantization dictionary, is motivated by the fact that, in 3D audio applications, it is beneficial to specifically represent the horizontal plane ($\phi=\pi/2$) because many artificial ambisonic content items are often defined with a zero Z component. The above definition of the dictionary $\{\hat{\phi}(i)\}$ also implies that the North and South poles (corresponding to $\phi=0$ and $\pi$) are also specifically included in the dictionary; the inclusion of the poles allows a complete representation of the sphere, and the impact is minimal because only 2 points of the grid are associated with the poles.

The azimuth $\theta$ is coded by scalar quantization on $N_2(i)$ levels in E202-2. Use is preferably made of a uniform scalar quantization in E202-2 with a uniform scalar quantization dictionary, taking into account the cyclic nature of the interval $[0,2\pi]$ so that it is not necessary to have both redundant bounds 0 and $2\pi$ as reconstruction levels:

$$\hat{\theta}(i, j) = \delta(i) + \frac{j}{N_2(i)}2\pi,\ j = 0, \ldots, N_2(i) - 1$$

where $N_2$ is for example defined in E203-2 by $$N_2(i) = \max\left(1, \left[\frac{360}{\alpha}\sin\hat{\phi}(i)\right]\right)$$

and $\delta(i)$ is a predetermined offset according to the invention. By definition, when the poles are included in the dictionary $\{\hat{\phi}(i)\}$, this gives $N_2(0)=1$ and $N_2(N_1-1)=1$.

The offset $\delta(i)$ is defined so as to "rotate" the "horizontal slice" of the sphere (delimited by the colatitude decision thresholds) associated with each colatitude of index i such that the coded azimuths are aligned as little as possible from one successive slice to the next.

In practice, it is possible to define the same dictionary in equivalent fashion in two processing blocks with a simplified dictionary (without an offset):

$$\hat{\theta}_{simp}(i, j) = \frac{j}{N_2(i)}2\pi,\ j = 0, \ldots, N_2(i)$$

by applying the offset $\delta(i)$ as pre-processing and post-processing of a uniform scalar quantization with the dictionary $\{\hat{\theta}_{simp}(i, j)\}$ (see the description of the coding with reference to FIG. 2*a* below).

In the above formulation of the simplified dictionary $\{\hat{\theta}_{simp}(i,j)\}$, it should be noted that a redundant quantization level $j=N_2(i)$ is deliberately added, in the knowledge that $\hat{\theta}_{simp}(i, 0)=\hat{\theta}_{simp}(i, N_2(i))$; this redundancy makes it possible to effectively take into account the cyclic nature of the interval $[0,2\pi]$ by minimizing the modulo operations.

The total number of points in the grid $\{(\hat{\phi}(i), \hat{\theta}(i, j))\ |i=0, \ldots, N_1-1, j=0, \ldots, N_2(i)-1\}$ is given by:

$$N_{tot} = \sum_{i=0}^{N_1-1} N_2(i)$$

thereby giving a rate of $\log_2 N_{tot}$ bits.

Table 1 gives some examples of resolutions $\alpha$ (in degrees) for obtaining a number of points $N_{tot}$ that makes it possible to get as close as possible to a target rate (in bits) in a grid, in which $N_1$ is a function of $\alpha$. The values of $\alpha$ are indicative here and, in some variants, other values may be used. It should be noted that, in general, a certain number of possible levels are not used because of the sequential construction constraint of the 3D grid.

TABLE 1

| Target rate R (bits) | Maximum number of levels $2^R$ | $\alpha$ (in degrees) | Number of points $N_{tot}$ |
|---|---|---|---|
| 8 | 256 | 12.5419921875 | 255 |
| 10 | 1024 | 6.29052734375 | 1021 |
| 12 | 4096 | 3.1580429077148438 | 4068 |
| 14 | 16384 | 1.592926025390625 | 16122 |
| 16 | 65536 | 0.7929811477661133 | 65326 |

In some variants, it is possible to replace the rounding to the nearest integer [.] in the definition of $N_1$ and/or $N_2(i)$, where i is one or more values of the set $i=0, \ldots, N_1-1$, with rounding to the lower or higher integer; this makes it possible to adjust in particular the number of points $N_{tot}$ in the spherical grid. In this case, the rounding convention that is used should of course be applied in the same way to the coding and decoding for determining the values of $N_1$ and/or $N_2(i)$.

Without loss of generality, the convention in which [.] corresponds to the rounding to the nearest integer will be kept below.

Given $N_1$ and the scalar quantization dictionary for the colatitude $\{\hat{\phi}(i)\}$, it is possible to determine $\delta(i)$ in line with various methods. In general, in the preferred case in which the poles and the equator are included in the colatitude dictionary, $\delta(0)=\delta((N_1-1)/2)=\delta(N_1-1)=0$ is set. Indeed, the poles are associated with only a single point since $N_2(0)=N_2((N_1-1)/2)=1$ in the preferred embodiment in which $\phi=0$ and $\pi$ are included in $\{\hat{\phi}(i)\}$, and the associated offset is therefore irrelevant. It is beneficial to keep a zero offset in the horizontal plane so as to have 3D directions that are able to be interpreted more easily, when $\phi=\pi/2$ is included in $\{\hat{\phi}(i)\}$.

Moreover, in a first embodiment of the determination of $\delta(i)$, it is stipulated that the offset is symmetrical or antisymmetrical for the North and South hemispheres, that is to say:

$$\delta((N_1-1)/2+i) = \delta((N_1-1)/2-i) \text{ or}$$
$$-\delta((N_1-1)/2-i),\ i = 1, \ldots, (N_1-1)/2-1.$$

In a first embodiment, the offset $\delta(i)$ is optimized sequentially for $i=1, \ldots, N_1-2$ by learning in successive "horizontal slices", starting from the "horizontal slice" just above the equator to the slice just before the North pole. In iteration i, $\delta((N_1-1)/2+i)$ is sought in order to minimize the quantization error for a spherical zone delimited by the elevations $\hat{\phi}((N_1-1)/2+i)$ and $\hat{\phi}((N_1-1)/2+i+1)$. This error may be estimated by Monte Carlo simulation of a source randomly distributed according to a uniform law over the surface of the sphere (for example by a Gaussian draw in dimension 3 and normalization), retaining only the random samples the elevation of which is between $\hat{\phi}((N_1-1)/2+i)$ and $\hat{\phi}((N_1-1)/2+i+1)$; these random samples are coded according to the invention by testing various candidate values of $\delta((N_1-1)/2+i)$. This is tantamount to applying the coding described in FIG. 2*a* only for input data the elevation of which is between $\hat{\phi}((N_1-1)/2+i)$ and $\hat{\phi}((N_1-1)/2+i+1)$. This coding is repeated for as many values $\delta((N_1-1)/2+i)$ to be tested, the value of $\delta((N_1-1)/2+i+1)$ being known in the previous iteration. The quantization error is measured for example in terms of mean squared error, and the candidate value of $\delta((N_1-1)/2+i)$ corresponding to the minimum is retained—for example, it will be possible to vary $\delta((N_1-1)/2+i)$ over an interval $$\left[0, \frac{j}{N_2(i)} 2\pi\right]$$

divided into 1000 equidistant steps.

Table 2 gives one example of an offset obtained through such learning (or such an optimization method) for the case of a 3D grid on 8 bits (defined in Table 1). It appears that this embodiment requires storing the $N_1$ values of $\delta(i)$. In some variants, it will be possible to store only the non-zero and non-redundant values $i=1, \ldots, (N_1-1)/2-1$, with the convention $((N_1-1)/2+i)=\delta((N_1-1)/2-i)$, $i=1, \ldots, (N_1-1)/2-1$. In some variants, it will be possible to adopt an antisymmetric convention around the equator.

TABLE 2

| i | Offset δ(i) (according to the invention) |
|---|---|
| 0 | 0 |
| 1 | 0.48171087355043485 |
| 2 | 0.0837758040957278 |
| 3 | 0.3036872898470134 |
| 4 | 0.09424777960769375 |
| 5 | 0.05074880440414277 |
| 6 | 0.11893172188589932 |
| 7 | 0 |
| 8 | 0.11893172188589932 |
| 9 | 0.05074880440414277 |
| 10 | 0.09424777960769375 |
| 11 | 0.3036872898470134 |
| 12 | 0.0837758040957278 |
| 13 | 0.48171087355043485 |
| 14 | 0 |

In some variants, other methods for determining the offset $\delta(i)$, $i=1, \ldots, N_1-2$ will be possible. For example, it will be possible to iteratively maximize the minimum circular distance (modulo $2\pi$) between the two sets of discrete azimuth values $$\hat{\theta}(i, j) = \delta(i) + \frac{j}{N_2(i)} 2\pi,\ j = 0, \ldots, N_2(i) - 1 \text{ and}$$

$$\hat{\theta}(i+1, j) = \delta(i+1) + \frac{j}{N_2(i+1)} 2\pi,\ j = 0, \ldots, N_2(i+1) - 1$$

where i ranges from $(N_1-1)/2-1$ up to 2 and $\hat{\theta}(i+1, j)$ is assumed to be known in the iteration i with $\delta(i+1)$ being set and constant. For a value of i, the following is determined:

$$\delta(i) \leftarrow \arg \max_{0 \le \delta(i) \le (\hat{\theta}(i,1) - \hat{\theta}(i,0))} \left( \min_{j1=0, \ldots, N_2(i), j2=0, \ldots, N_2(i+1)-1} d_{mod}\left(\hat{\theta}(i, j1), \hat{\theta}(i+1, j2)\right) \right)$$

where $\delta(i+1)$ is known in each step (starting from $\delta((N_1-1)/2)=0$) and $d_{mod}(.)$ is the circular distance modulo $2\pi$—in the case where multiple values of $\delta(i)$ reach the optimum, the smallest one will preferably be retained. This (alternative) embodiment in theory requires storing the values of $\delta(i)$.

In some variants, the offset $\delta(i)$ will be defined at predetermined values so as not to have to store these values.

In a first variant, the constraint $\delta(0)=\delta((N_1-1)/2)=\delta(N_1-1)=0$ will be kept and $$\delta(i) = \frac{\pi}{N_2(i)},\ i = 1, \ldots, (N_1-1)/2,$$

will be set, that is to say half of the azimuth scalar quantization step, given the colatitude index i (excluding poles and equator). Moreover, $\delta((N_1-1)/2+i)=\delta((N_1-1)/2-i)$ or $-\delta((N_1-1)/2-i)$, $i=1, \ldots, (N_1-1)/2-1$ will be adopted.

In a second variant, $$\delta(i) = \frac{\pi}{N_2(i)},\ i = 1, 3, (N_1-1)/2-1$$

(odd values of i) and $\delta(i)=0$ for $i=0,2, (N_1-1)/2$ (odd values of i) will be set. Moreover, $\delta((N_1-1)/2+i)=\delta((N_1-1)/2-i)$ or $-\delta((N_1-1)/2-i$, $i=1, \ldots, (N_1-1)/2$ will be adopted.

In a third variant, the offset is set to $\delta(i)=0$ and other aspects of the invention are implemented. In other variants, other values of $\delta(i)$ may be used.

In one particular embodiment, the number of levels $N_1$ may be set directly to a (preferably odd) integer value, without seeking to approximate an angular resolution $\alpha$. It is possible, from $N_1$, to deduce an angular resolution, which corresponds, in one particular mode, to the quantization step:

$$\alpha = \frac{180}{N_1 - 1}$$

(in degrees). The determination of the number of levels $N_2(i)$ is repeated with this value of $\alpha$ with $N_2(i)=\max(1, [2(N_1-1)\sin\hat{\phi}(i)])$.

However, this particular mode has the drawback of generally having less fineness in terms of the allocation of the number of points per spherical layer to achieve a certain target rate.

Table 3 gives some examples of the number of points $N_{tot}$ for values $N_1$ that make it possible to get close to a target rate (in bits) in a grid in which $N_1$ is given directly.

TABLE 3

| Target rate R (bits) | Maximum number of levels 2R | $N_1$ | Number of points $N_{tot}$ |
|---|---|---|---|
| 8 | 256 | 15 | 248 |
| 10 | 1024 | 29 | 998 |

TABLE 3-continued

| Target rate R (bits) | Maximum number of levels 2R | $N_1$ | Number of points $N_{tot}$ |
|---|---|---|---|
| 12 | 4096 | 57 | 3998 |
| 14 | 16384 | 113 | 15974 |
| 16 | 65536 | 227 | 65038 |

In some variants, it is possible to adopt $$N_1 = \left\lceil \frac{180}{\alpha} \right\rceil,$$

but this does not guarantee that the equator (corresponding to $\phi=\pi/2$) is included in the quantization dictionary. In this case, some indexing variants—described below—assuming the inclusion of the equator will not be able to be implemented.

In other variants, it will not be possible to represent the poles, for example by defining the reconstruction levels of the colatitude as:

$$\hat{\phi}(i) = \frac{i+1}{N_1+1}\pi, \quad i = 0, \ldots, N_1 - 1$$

In this case, some indexing variants-described below-assuming the inclusion of the poles will not be able to be implemented or will have to be adapted.

A presentation will now be given of a method for coding the spherical coordinates $(\phi, \theta)$ of an input point on a sphere in dimension 2 illustrated in FIG. 2*a*.

A description will now be given of an optimum search algorithm for the squared error (or Euclidean distance), this corresponding to the length of the chord between $(\phi, \theta)$ and $\{(\hat{\phi}(i), \hat{\theta}(i, j))\}$, or the angular distance that is associated with the length of the circular arc between these points.

The quantization of the spherical coordinates and the search is carried out sequentially as follows:

Given a 3D point (x,y,z) in E200 assumed to be on $S_2$ (with a radius 1), $\phi$ is first of all determined in E201 as:

$\phi=\arccos z$

The colatitude $\phi$ is first of all coded in E202-1. In order for the search to be optimum, it is necessary to retain the 2 closest values $\hat{\phi}(i_1(0))$ and $\hat{\phi}(i_1(1))$ (the closest of index $i_1(0)$ and the second closest $i_1(1)$) in step E204-1:

$$i_1(0) = \arg\min_{i=0,\ldots,N_1-1} \left(\phi - \hat{\phi}(i)\right)^2$$

$$i_1(1) = \arg\min_{\substack{i=0,\ldots,N_1-1 \\ i \neq i_1(0)}} \left(\phi - \hat{\phi}(i)\right)^2$$

In some variants, it is possible to determine $i_1(0)$ and $i_1(1)$ by direct quantization—one exemplary embodiment for the case of a uniform scalar dictionary of the form $$\hat{\phi}(i) = \frac{i}{N_1-1}\pi$$

is given below:

if $\phi=0$, $i_1(0)=0$ and $i_1(0)=1$ if not:

if $\phi=\pi$, $i_1(0)=N_1-1$, $i_1(1)=N_1-2$ if not: $i_1(0)=\lfloor\phi/s\rfloor$ and $i_1(1)=\lceil\phi/s\rceil$, where $\lfloor.\rfloor$ and $\lceil.\rceil$ denote the rounding to the lower and higher integer (respectively) and $$s = \frac{\pi}{N_1 - 1}$$

is the scalar quantization step

It should be noted in all cases that the indices $i_1(0)$ and $i_1(1)$ may be permuted without this changing the result of the coding.

This thus gives two indices corresponding to the two points of the dictionary $\{\hat{\phi}(i_1(0)), \hat{\phi}(i_1(1))\}$ closest to $\phi$.

The azimuth is then determined in E201

$$\theta = \begin{cases} \arccos y/\sqrt{y^2+z^2} & z \geq 0 \\ 2\pi - \arccos y/\sqrt{y^2+z^2} & z < 0 \end{cases}$$

defined in $[0,2\pi]$. In some variants, it is possible to use the arctan function over 4 quadrants (denoted arctan 2):

$\theta=\arctan 2(y,x)$ but in this case the azimuth $\theta$ is defined in $[-\pi, \pi]$ and it will be necessary to adapt the quantization dictionary (with an offset of $-\pi$).

The azimuth $\theta$ is coded by way of uniform scalar quantization in E204-2 with an adaptive number of levels $N_2(i)$ in which $i=i_1(0)$ or $i_1(1)$, as described above in step E203-2, in order to obtain, in E204-2, the two values $\hat{\theta}(i_1(0), i_2(0))$ and $\hat{\theta}(i_1(1), i_2(1))$, respectively. Preferably, the uniform scalar quantization in E204-2 is implemented in two processing blocks with a simplified dictionary (without a offset):

$$\hat{\theta}_{simp}(i, j) = \frac{j}{N_2(i)}2\pi, \quad j = 0, \ldots, N_2(i)$$

The offset $-\delta(i)$ is first of all applied to the input:

$$\theta' = \mathrm{mod}_{2\pi}(\theta - \delta(i_1(m)))$$

where $\mathrm{mod}_{2\pi}(x)$ is the operation modulo $2\pi$, and then the following is quantized in the dictionary:

$$i_2(m) = \arg\min_j \left\| \theta' - \hat{\theta}_{simp}(i_1(m), j) \right\|^2, \quad m = 0, 1.$$

This quantization in the dictionary may be carried out directly as follows for an input $\theta' \in [0,2\pi]$:

if $\theta'=0$, $i_2(m)=0$ and $i_1(m)=1$ if not:

if $\theta'=2\pi$, $i_2(m)=N_2(i_1(m))$ if not: $i_2(m)=[\theta'/s]$, where [.] denotes the rounding to the nearest integer and $$s=\frac{2\pi}{N_2(i_1(m))}$$

is the scalar quantization step if $i_2(m)=N_2(i_1(m))$, $i_2(m)\leftarrow 0$

The corresponding reconstruction level is:

$$\hat{\theta}(i_1(m),\, i_2(m)) = \hat{\theta}_{simp}(i,\, j) + \delta(i_1(m)) = \frac{i_2(m)}{N_2(i)}2\pi + \delta(i_1(m))$$

This therefore corresponds to a scalar quantization with the dictionary $\{\hat{\theta}(i,j)\}$, or in equivalent fashion with the dictionary $\{\hat{\theta}_{simp}(i,j)\}$ and pre-processing $\mathrm{mod}_{2\pi}(\theta-\delta(i_1(m)))$ and post-processing $\hat{\theta}_{simp}(i, j)+\delta(i_1(m))$.

In step E205, this gives two candidates ($2^{n-2}$ with n=3) $\hat{x}(m)=(\hat{\phi}(i_1(m)), \hat{\theta}(i_1(m), i_2(m)))$, m=0 or 1.

Step E206 comprises selecting the candidate $\hat{x}(m)$m=0, 1 closest to x=(x,y,z) and $$\hat{x}(m) = \big(r\sin\hat{\phi}(i_1(m))\cos\hat{\theta}(i_1(m),\, i_2(m)),\; r\sin\hat{\phi}(i_1(m))\sin\hat{\theta}(i_1(m),\, i_2(m)),\; r\cos\hat{\phi}(i_1(m))\big)$$

in Cartesian coordinates.

The distance criterion may be the Euclidean distance $\|x-\hat{x}(m)\|^2$ that is to be minimized or the scalar product $x\cdot\hat{x}(m)$ that is to be maximized. For example:

$$m^* = \arg\min_{m=0,1}\sum_{l=1}^{3}(x_l-\hat{x}_l(m))^2$$

The quantization indices selected in E206 correspond to the selected point: $(i_1(m^*), i_2(m^*))$ with m*=0 or 1.

In some variants, it is possible to carry out the last step without passing back through the Cartesian coordinates, by computing a distance directly in the domain of the spherical coordinates. It is possible to evaluate a distance in the domain of the spherical coordinates between (φ, θ) and $\{(\hat{\phi}(i_1(m)), \hat{\theta}(i_1(m), i_2(m)))\}$. Starting from the angular distance $$dist_{ang}\big((\phi_1,\phi_2),\,(\hat{\phi}_1(m),\hat{\phi}_2(m))\big) = \arccos\big(\cos\phi_1\cos\hat{\phi}_1(m)+\sin\phi_1\sin\hat{\phi}_1(m)\cos(\phi_2-\hat{\phi}_2(m))\big)$$

it is therefore possible to minimize:

$$m^* = \arg\max_{m=0,1}\cos\phi\cos\hat{\phi}(i_1(m))+\sin\phi\sin\hat{\phi}(i_1(m))\cos\big(\theta-\hat{\theta}(i_1(m),\, i_2(m))\big)$$

To simplify the notations, these indices will be denoted in the remainder of the description of FIG. 2*a* as (i,j) so as to designate respectively the selected indices $(i_1(m^*), i_2(m^*))$ with m*=0 or 1.

The indexing step E207 is now described in line with various methods. In this step, a global quantization index is determined on the basis of the separate indices (i, j) resulting from the separate quantization of the spherical coordinates for the selected closest point.

Based on the indices (i, j), where, $0\le i\le N_1-1$ and $0\le j\le N_2(i)-1$, a single index $0\le index<N_{tot}$ to be transmitted is determined in E207.

In one preferred implementation of the first embodiment, use is made of pre-storage (tabulation) of the cumulative cardinality sums defined by $offset_1(0)=0$ and $offset_1(i)=\Sigma_{l=0}^{i-1}N_2(l)$ of successive spherical zones (or "sets of horizontal slices"). This sum off $set_1(i)$ may be interpreted as the cardinality of a discretized spherical zone (the number of points of the partial grid ranging from the colatitude of index 0 to the colatitude of index i).

Table 4 gives one example of a table $\{offset_1(i)\}$ for the case of a 3D grid (for α=12.5419921875, with $N_1$=15).

TABLE 4

| i | $N_2(i)$ | $offset_1(i)$ |
|---|---|---|
| 0 | 1 | 0 |
| 1 | 6 | 1 |
| 2 | 12 | 7 |
| 3 | 18 | 19 |
| 4 | 22 | 37 |
| 5 | 26 | 59 |
| 6 | 28 | 85 |
| 7 | 29 | 113 |
| 8 | 28 | 142 |
| 9 | 26 | 170 |
| 10 | 22 | 196 |
| 11 | 18 | 218 |
| 12 | 12 | 236 |
| 13 | 6 | 248 |
| 14 | 1 | 254 |
| 15 | — | 255 |

This precomputed cumulative sum stored in memory is used to determine the elevation index. The global index is thus computed as:

$$index = offset_1(i)+j$$

The global index index is thus obtained by sequential coding of the separate quantization indices i, j of the best candidate.

In this case, the value 0 corresponds to the North pole and the value $offset_1(N_1-1)$ corresponds to the South pole. The value $offset_1(N_1)=N_{tot}$ is defined here so as to enable the decoding of index (see further below with reference to FIG. 2*b*).

In some variants, it is possible not to store the values $offset_1(i)$, but to compute them "online" (in real time) based on their definition: $offset_1(i)=\Sigma_{l=0}^{i-1}N_2(l)$.

However, this adds computational complexity that may be non-negligible if the grid comprises a large number of points.

In some variants, it is possible to index starting from the South pole by inverting the order of the indices on the elevation from $N_1-1$ to 0 instead of from 0 to $N_1-1$, and in general the sum defining $offset_1(i)=\Sigma_{l=0}^{i-1}N_2(l)$ may be carried out with any predetermined permutation of the indices l. Thus, in other variants, the order of indexing of the "spherical slices" may be permuted. Rather than indexing starting from the North pole to the South pole passing through the equator, the starting point is the equator, and then the North hemisphere is coded (without the equator), and then the South hemisphere.

In one variant, this will give $\text{offset}_1(0)=0$ and $\text{offset}_1(N_1)=N_{tot}$, and then the equator will be indexed first by setting $\text{offset}_1(1)=N_2((N_1-1)/2)$, and then it will be possible to code the North hemisphere (without the equator) with $(\text{offset}_1(N_1)-\text{offset}_1(1))/2$ points for the indices $$i=0,\ldots,\frac{(N_1-1)}{2}-1,$$

and then it will be possible to code the South hemisphere (without the equator) and starting from the South pole, where the index $i>(N_1-1)/2$ is "inverted": $i'=N_1-1-i$.

In a second embodiment, the coding steps are identical to those of the first embodiment, except for the step of determining the number $N_2(i)$ in E203-2 and the indexing step in E207, which are specific to this second embodiment and detailed below.

The values $N_2(i)$ giving the number of coded azimuth values in each "spherical slice" associated with the coded colatitude of index i will be set in this second embodiment so as to allow analytical indexing.

The dictionaries are preferably defined as in the first embodiment:

$$\hat{\phi}(i)=\frac{i}{N_1-1}\pi,\ i=0,\ldots,N_1-1,$$

in which for example $$N_1=2\left[\frac{90}{\alpha}\right]+1$$

—in some variants, $N_1$ may be an integer that is preferably odd $$\hat{\theta}(i,j)=\delta(i)+\frac{j}{N_2(i)}2\pi,\ j=0,\ldots,N_2(i)-1.$$

in which the offset $\delta(i)$ is set as described in the first embodiment and $N_2(i)$ is defined below on the basis of the partial surface area on the sphere, of the values $\hat{\phi}(i)$ and of a total number $N_{tot}$. Typically, the values of $N_1$ and the total number $N_{tot}$ needed to determine $N_2(i)$ may be initialized as determined in the first embodiment: for example $N_1=227$ and $N_{tot}=65326$ for $\alpha=0.7929811477661133$ as in Table 1 (with 210 unused values for a target rate of 16 bits), but it will also be possible to set different values such as $N_1=229$ and $N_{tot}=65536$ in particular so as to limit the number of unused points for a given rate.

A description will now be given of the principle of the analytical determination of the number of coding levels $N_2(i)$ for the azimuth and the cumulative number of points off $\text{set}_1(i)$ up to a certain spherical slice of index i (exclusively).

Various methods for determining the number of levels $N_2(i)$ are defined. They all have the common feature of using rounding to a predefined integer (for example the nearest integer) of an estimate of a number of points of the grid based on a total number of points and on the surface area of a spherical zone delimited by colatitude values (thresholds), this surface area itself being normalized by the surface area of a spherical zone that is for example the complete sphere or the complete sphere except the polar caps.

The surface area of an element around the point $(\theta, \phi)$ on the sphere $\mathbb{S}_2$ is given by $dA=r^2\sin\phi d\theta d\phi$, where $\phi$ here is the colatitude (if elevation were to be used, this would give a term in $\cos\phi$). The partial surface area defined by a spherical zone delimited by two horizontal planes brought about by a colatitude interval $[\phi_{min}, \phi_{max}]$, where $0\le\phi_{min}<\phi_{max}\le\pi$, the azimuth being over $[0,2\pi]$, is given by:

$$A(\phi_{min},\phi_{max})=r^2\int_0^{2\pi}d\theta\int_{\phi_{min}}^{\phi_{max}}\sin\phi d\phi=2\pi r^2(\cos\phi_{min}-\cos\phi_{max})$$

In particular, this gives the known result that the surface area of the sphere $\mathbb{S}_2$ of radius r is $A_{tot}=A(0,\pi)=4\pi r^2$ (for $\phi_{min}=0$ and $\phi_{max}=\pi$).

For a number of points $N_{tot}$ in the spherical grid (or spherical vector quantization dictionary), each "decision region" associated with a point of the grid is approximated here by a "spherical rectangle" for indexing purposes (this corresponding to a non-sequential decision for separate coding of the spherical coordinates). Each of these regions should ideally have a surface area of $4\pi r^2/N_{tot}$ if the grid is uniform.

For a uniform discretization of the colatitude with:

$$\hat{\phi}(i)=\frac{i}{N_1-1}\pi,\ i=0,\ldots,N_1-1$$

it is therefore possible, in E203-2, to estimate the number of points on the grid contained within a spherical zone (or "spherical slice") of index i delimited by the two horizontal planes associated with the decision thresholds $\phi_{min}=(\hat{\phi}(i)+\hat{\phi}(i-1))/2$ and $\phi_{max}=(\hat{\phi}(i)+\hat{\phi}(i+1))/2$ by a simple rule of three, in the following form:

$$\frac{A(\phi_{min},\phi_{max})}{A_{tot}}N_{tot}=\left(\cos\frac{\hat{\phi}(i)+\hat{\phi}(i-1)}{2}-\cos\frac{\hat{\phi}(i)+\hat{\phi}(i+1)}{2}\right)\frac{N_{tot}}{2}$$

which may be rounded to an integer (for example the nearest integer, or lower integer, or higher integer, etc.).

It is also possible, in E203-2, to estimate the number of points on the grid contained within a spherical zone between the North pole and the limit of the "spherical slice" of index i delimited by the horizontal plane associated with the decision threshold $\phi_{max}=(\hat{\phi}(i)+\hat{\phi}(i+1))/2$, as:

$$\frac{A(0,\phi_{max})}{A_{tot}}N_{tot}=\left(1-\cos\frac{\hat{\phi}(i)+\hat{\phi}(i+1)}{2}\right)\frac{N_{tot}}{2}$$

which may be rounded to an integer.

With these results, it is possible, in E203-2, to define the values $N_2$ in the second embodiment in the following form:

$$N_2(i)=\max\left(1,\left[\left(1-\cos\left(\frac{i+0.5}{N_1-1}\pi\right)\right)\frac{N_{tot}}{2}\right]-\left[\left(1-\cos\left(\frac{i-0.5}{N_1-1}\pi\right)\right)\frac{N_{tot}}{2}\right]\right),\quad i=0,\ldots,N_1-1$$

This number of levels is obtained by way of a (rounded) estimate of the number of points in the grid based on the total number $N_{tot}$ and on the surface area of a (normalized) spherical zone between the North pole and the upper limit of the "spherical slice" of index i delimited by the horizontal plane associated with the decision threshold $\phi_{max}=(\hat{\phi}(i)+\hat{\phi}(i+1))/2$—this surface area being normalized by the total surface area of the sphere.

In some variants, it is possible to adopt the following in E203-2:

$$N_2(i) = \max\left(1, \left[\left(\cos\left(\frac{i-0.5}{N_1-1}\pi\right) - \cos\left(\frac{i+0.5}{N_1-1}\pi\right)\right)\frac{N_{tot}}{2}\right]\right),\ i = 0, \ldots, N_1-1$$

This number of levels is obtained by way of a (rounded) estimate of the number of points in the grid based on the total number $N_{tot}$ and on the surface area of a spherical zone (or "spherical slice") of index i delimited by the two horizontal planes associated with the decision thresholds $\phi_{min}=(\hat{\phi}(i)+\hat{\phi}(i-1))/2$ and $\phi_{max}=(\hat{\phi}(i)+\hat{\phi}(i+1))/2$.

In some variants, it will be possible, in E203-2, to separately define the number of levels for the poles and excluding poles in the following form:

$$N_2(0) = N_2(N_1-1) = 1$$

$$N_2(i) = \left[\left(\cos\left(\frac{i-0.5}{N_1-1}\pi\right) - \cos\left(\frac{i+0.5}{N_1-1}\pi\right)\right)\frac{N_{tot}-2}{\cos\left(\frac{0.5}{N_1-1}\pi\right) - \cos\left(\frac{N_1-0.5}{N_1-1}\pi\right)}\right],$$

$$i = 1, \ldots, N_1-2$$

This number of levels (excluding poles) is obtained by way of a (rounded) estimate of the number of points in the grid based on the (modified) total number $N_{tot}-2$ and on the surface area of a spherical zone between the North pole and the limit of the "spherical slice" of index i delimited by the horizontal plane associated with the decision threshold $\phi_{max}=(\hat{\phi}(i)+\hat{\phi}(i+1))/2$—this surface area being normalized by the surface area of the spherical zone delimited by the two horizontal planes associated with the decision thresholds $\phi_{min}=(\hat{\phi}(0)+\hat{\phi}(1))/2$ and $\phi_{max}=(\hat{\phi}(N_1-2)+\hat{\phi}(N_1-1))/2$.

In some variants, it will also be possible to adjust the determination of $N_2(i)$ by modifying the type of rounding (lower or higher integer instead of the nearest integer) for certain values of i, or even to adjust the value of $N_{tot}$. For example, it is possible, in E203-2, to adopt a modified definition for i=1:

$$N_2(1) = \left\lfloor\left(1-\cos\left(\frac{1+0.5}{N_1-1}\pi\right)\right)\frac{N_{tot}}{2}\right\rfloor - \left\lfloor\left(1-\cos\left(\frac{1-0.5}{N_1-1}\pi\right)\right)\frac{N_{tot}}{2}\right\rfloor,$$

where $\lfloor . \rfloor$ is the rounding to the lower integer.

In general, the values $N_2(i)$ obtained in this second step are different from the values $$N_2(i) = \max\left(1, \left[\frac{360}{\alpha}\sin\hat{\phi}(i)\right]\right)$$

defined in the first embodiment, even if $N_{tot}$ is defined as in the first embodiment.

With the values $N_2(i)$ thus defined, the azimuth dictionaries may therefore be determined as:

$$\hat{\theta}(i, j) = \delta(i) + \frac{j}{N_2(i)}2\pi,\ j = 0, \ldots, N_2(i)-1$$

where $N_2(i)$ is determined according to the second embodiment.

In general, the following equality is obtained by construction (where $N_{tot}$ is a given integer value for the determination of the values $N_2(i)$):

$$N_{tot} = \sum_{i=0}^{N_1-1} N_2(i)$$

If this equality is not satisfied, in particular for low values $N_{tot}$, it will be necessary to adjust certain parameters, for example adjust the value of $N_{tot}$, or adjust the computing of the rounding in the definition of $N_2(i)$ or directly set the value $N_2(i)$ for certain values of i.

In this second embodiment, the indexing in E207 is simplified. The global index is computed as:

$$\text{index} = \text{offset}_1(i) + j$$

The global index index is thus obtained by sequential coding of the separate quantization indices i, j of the best candidate.

For the preferred definition of $\hat{\phi}(i)$ used here with a uniform scalar quantization and rounding to the nearest integer:

$$\text{offset}_1(0) = 0$$

$$\text{offset}_1(i) = \left[\left(1-\cos\left(\frac{i-0.5}{N_1-1}\pi\right)\right)\frac{N_{tot}}{2}\right],\ i = 1, \ldots, N_1-1$$

The values $\text{offset}_1(i)$, for at least some indices i, are thus obtained by way of a (rounded) estimate of the number of points in the grid based on the total number ($N_{tot}$) and on the surface area of a spherical zone between the North pole and the lower limit of the "spherical slice" of index i delimited by the horizontal plane associated with the decision threshold $\phi_{min}=(\hat{\phi}(i)-\hat{\phi}(i+1))/2$—this surface area being normalized by the total surface area of the sphere.

In some variants, it is possible to define for example:

$$\text{offset}_1(0) = 0$$

$$\text{offset}_1(i) = \left[\left(\cos\left(\frac{i-0.5}{N_1-1}\pi\right) - \cos\left(\frac{i+0.5}{N_1-1}\pi\right)\right)\frac{N_{tot}-2}{\cos\left(\frac{0.5}{N_1-1}\pi\right) - \cos\left(\frac{N_1-0.5}{N_1-1}\pi\right)}\right], i = 1, \ldots, N_1-2$$

$$\text{offset}_1(N_1-1) = N_{tot}-1$$

Here, the values $\text{offset}_1(i)$, for at least some indices i, are obtained by way of a (rounded) estimate of the number of points in the grid based on the modified total number $N_{tot}-2$ and on the surface area of a spherical zone between the North pole and the lower limit of the "spherical slice" of index i delimited by the horizontal plane associated with the decision threshold $\phi_{min}=(\hat{\phi}(i)+\hat{\phi}(i+1))/2$—this surface area being normalized by the surface area of the spherical zone delimited by the two horizontal planes associated with the decision thresholds $\phi_{min}=(\hat{\phi}(0)+\hat{\phi}(1))/2$ and $\phi_{max}=(\hat{\phi}(N_1-2)+\hat{\phi}(N_1-1))/2$.

i is multiplexed first of all, and then j is multiplexed. It should be noted that, when $N_2(i)=1$, the coding takes 0 bits for the index j, and this coding is therefore not necessary.

In a second variant, the indices i, j will be coded sequentially with Huffman entropy coding or arithmetic coding. It is possible to use an estimate of the probability of each value of the index i between 0 and $N_1$ by determining the partial surface area of the sphere in the slice associated with the index $i_k$ for the coordinate $\phi_k$, this area being normalized by the total area of the sphere for this same coordinate $\phi_k$, that is to say:

$$Prob(0) = \frac{A(0, \phi_{max})}{A_{tot}} = \frac{1}{2}\left(1 - \cos\frac{\hat{\phi}(0)+\hat{\phi}(1)}{2}\right)$$

$$Prob(i) = \frac{A(\phi_{min}, \phi_{max})}{A_{tot}} = \frac{1}{2}\left(\cos\frac{\hat{\phi}(i)+\hat{\phi}(i-1)}{2} - \cos\frac{\hat{\phi}(i)+\hat{\phi}(i+1)}{2}\right), i = 1, \ldots, N_1-2$$

$$Prob(N_1-1) = \frac{A(\phi_{min}, \pi)}{A_{tot}} = \frac{1}{2}\left(\cos\frac{\hat{\phi}(N_1-1)+\hat{\phi}(N_1-2)}{2} + 1\right)$$

It should be noted that this second embodiment requires sufficient computing precision—in terms of the computing of trigonometric functions—in order to correctly determine the values of $N_2(i)$ and $\text{offset}_1(i)$.

In some variants of the second embodiment, the scalar quantization dictionary $\{\hat{\phi}(i)\}$ may be different, in which case the terms $$\cos\left(\frac{i+0.5}{N_1-1}\pi\right) \text{ and } \cos\left(\frac{i-0.5}{N_1-1}\pi\right)$$

in the definition of $N_2(i)$ and $\text{offset}_1(i)$ will be adapted to cos $((\hat{\phi}(i)+\hat{\phi}(i+1))/2)$ and cos $((\hat{\phi}(i)+\hat{\phi}(i-1))/2)$, respectively. It should be noted here that the values $(\hat{\phi}(i)+\hat{\phi}(i+1))/2$ correspond in fact to scalar quantization decision thresholds; these thresholds define the integration limits for determining the number of points based on the partial surface area on the sphere to a certain spherical slice.

In a third embodiment, all of the coding steps E201 to E206 are identical to the two previous embodiments and step E207 consists in sequentially coding, in binary form, the 2 indices $i_1(m^*>>1)$, $i_2(m^*)$, abbreviated to i, j, corresponding to the best candidate. This coding is sequential because the number of possible values $N_2(i)$ for the azimuth depends on the index i of the colatitude.

In a first variant, this sequential coding will use binary coding with a fixed rate of i, j on $\lceil \log_2 N_1 \rceil$ bits and $\lceil \log_2 N_2(i) \rceil$ bits, respectively, where $\lceil . \rceil$ denotes the rounding to the higher integer, with the convention $\lceil 0 \rceil=0$. The multiplexing therefore takes place sequentially in order to form a bit string of variable total bit length $\lceil \log_2 N_1 \rceil + \lceil \log_2 N_2(i) \rceil$.

in the case of a dictionary including the poles.

If $N_2(i)>1$, the coding of the index j may simply be carried out with a fixed length because, in this case, the probability estimate would be equiprobable ($Prob(j|i)=1/N_2(i)$ if $N_2(i)>1$) for a uniform distribution on the sphere. In some variants, other estimates of the probabilities Prob(i) and Prob(j|i) will be possible if the distribution of the source on the sphere in dimension 3 is assumed to be non-uniform.

In variants in which elevation is coded instead of colatitude, the appropriate conversions of the definitions of $N_2(i)$ and $\text{offset}_1(i)$ (by changing the terms from cosine to sine, etc.) and of the quantization dictionary $\{\hat{\phi}(i)\}$ will be carried out.

The corresponding decoding method, for dimension 3, is now described with reference to FIG. 2*b*.

First of all, indexing according to the first embodiment described with reference to FIG. 2*a* is assumed.

Given the global index index in step E210, sequential decoding of the two spherical coordinates is carried out in steps E211-1 and E211-2.

In step E212-1, as in coding step E203-1, a number of scalar quantization levels $N_1$ is determined according to one of the variants described in the coding (either by setting a resolution or directly).

The index i is decoded according to the coding method that is used.

The first focus is on decoding, in a first embodiment.

The index i of the colatitude is found in E213-1 by way of a search in the cardinality table:

$$i = \max\{l \in \{0, \ldots, N_1-1\} \mid \text{index} < \text{offset}_1(l+1)\}$$

To this end, the following convention is defined:

$$\text{offset}_1(N_1)=N_{tot}$$

It is possible to determine the value of $\text{offset}_1(i)$ as described in the coding in step E207.

In one variant embodiment, the cardinality table has been stored in memory, in full or in part.

In one variant embodiment, it may be computed in real time based on its definition: $\text{offset}_1(i)=\Sigma_{l=0}^{i-1}N_2(l)$.

In some variants, it is possible to store or compute "online" (in real time) only $(N_1-1)/2+1$ values of the table $\text{offset}_1(i)$ as described for the coding.

The decoded colatitude is reconstructed in E214-1 as follows:

$$\hat{\phi}(i)=\frac{i}{N_1-1}\pi$$

In some variants, other uniform or non-uniform quantization dictionaries $\{\hat{\phi}(i)\}$ will be possible, in a manner identical to the coding.

The index j of the azimuth is found in E213-2 by subtraction according to the following formula: $j=\text{index}-\text{offset}_1(i)$ based on the global index index and on the decoded colatitude index i.

In some indexing variants described for the coding with reference to FIG. 2*a*, the decoding of the index j will be adapted on the basis of the indexing method that is used.

The value of the offset $\delta(i)$ is determined as defined in the coding, and the azimuth $\hat{\theta}(i, j)$ is reconstructed in E214-2 as follows:

$$\hat{\theta}(i,j)=\delta(i)+\frac{j}{N_2(i)}2\pi$$

This thus gives the spherical coordinates $(\hat{\phi}(i), \hat{\theta}(i, j))$ of the decoded point in E215.

In this step E215, a conversion of the spherical coordinates is optionally carried out, for example in order to convert a colatitude and an azimuth in radians into an elevation and an azimuth in degrees.

It is then possible to reconstruct the decoded point $(\hat{x}, \hat{y}, \hat{z})$ in E216 as follows:

$$\hat{x}=r\sin\hat{\phi}(i)\cos\hat{\theta}(i,j),\hat{y}=r\sin\hat{\phi}(i)\sin\hat{\theta}(i,j),\hat{z}=r\cos\hat{\phi}(i)$$

where, without loss of generality, r=1. Step E216 will be adapted to other spherical coordinate systems and units other than radians where applicable.

In some variants, the last step E216 of converting spherical coordinates to Cartesian coordinates will be optional.

In a second embodiment, the decoding steps are identical to those of the first embodiment, except for the step of determining the index i in E213-1, the step of determining the number $N_2(i)$ in E212-2, and the step of determining the index j in E213-2.

The decoding of the index i in E213-1, in a second embodiment, is carried out analytically by taking the value:

$$i=\left\lfloor\frac{N_1-1}{\pi}\arccos\left(1-\frac{\text{index}+0.5}{\frac{N_{tot}}{2}}\right)\right\rfloor$$

assuming that the index was obtained with the definition in the coding:

$$\text{index}=\text{offset}_1(i)+j$$

where $\text{offset}_1(i)$ is obtained directly and analytically:

$$\text{offset}_1(0)=0$$

$$\text{offset}_1(i)=\left\lfloor\left(1-\cos\left(\frac{i-0.5}{N_1-1}\pi\right)\right)\frac{N_{tot}}{2}\right\rfloor,\ i=1,\ \ldots\ ,N_1-1$$

The analytical decoding of the index i therefore corresponds to applying an inverse function of $$\left\lfloor\left(1-\cos\left(\frac{i-0.5}{N_1-1}\pi\right)\right)\frac{N_{tot}}{2}\right\rfloor$$

as a function of i.

In the variants in which $\text{offset}_1(i)$ is defined differently, the inverse function will be adapted by a person skilled in the art in an obvious manner.

In some variants, the following will also be defined:

$$\text{offset}_1(N_1)=N_{tot}$$

and it will be possible to apply the decoding of the index i in E213-1 and of the index j in E213-2 as in the first embodiment based on the values $\text{offset}_1(i)$ that are computed "in real time" or pre-stored. This then loses the advantage of directly determining the index i in E213-1 by way of an inverse function, but retains the advantage of analytical determination of off set (i).

The number of levels in step E212-2 for the coding of the azimuth is given as in the coding in E203-2. Multiple possible variants will be recalled:

$$N_2(i)=\max\left(1,\left\lfloor\left(1-\cos\left(\frac{i+0.5}{N_1-1}\pi\right)\right)\frac{N_{tot}}{2}\right\rfloor-\left\lfloor\left(1-\cos\left(\frac{i-0.5}{N_1-1}\pi\right)\right)\frac{N_{tot}}{2}\right\rfloor\right),\ i=0,\ \ldots\ ,N_1-1$$

or $$N_2(i)=\max\left(1,\left\lfloor\left(\cos\left(\frac{i-0.5}{N_1-1}\pi\right)-\cos\left(\frac{i+0.5}{N_1-1}\pi\right)\right)\frac{N_{tot}}{2}\right\rfloor\right),\ i=0,\ \ldots\ ,N_1-1$$

or $$N_2(0)=N_2(N_1-1)=1$$

$$N_2(i)=\left\lfloor\left(\cos\left(\frac{i-0.5}{N_1-1}\pi\right)-\cos\left(\frac{i+0.5}{N_1-1}\pi\right)\right)\frac{N_{tot}-2}{\cos\left(\frac{0.5}{N_1-1}\pi\right)-\cos\left(\frac{N_1-0.5}{N_1-1}\pi\right)}\right\rfloor,\ i=1,\ \ldots\ ,N_1-2$$

The index j of the azimuth is found in E213-2 by subtraction according to the following formula:

$$j=\text{index}-\text{offset}_1(i)$$

It should be noted that, in the second embodiment, the value $\text{offset}_1(i)$ is determined analytically with:

$$\text{offset}_1(0)=0$$

$$\text{offset}_1(i)=\left[\left(1-\cos\left(\frac{i-0.5}{N_1-1}-\pi\right)\right)\frac{N_{tot}}{2}\right],\ i=1,\ \dots\ ,N_1-1$$

A reminder of the variants defined in the coding will not be given here, and the decoding in E213-2 should follow the same definition of $N_2(i)$ and $\text{offset}_1(i)$ as in the coding.

In some variants, it will be possible to store these values $\text{offset}_1(i)$.

In some variants of the second embodiment, the scalar quantization dictionary $\{\hat{\phi}(i)\}$ may be different, in which case the terms $$\cos\left(\frac{i+0.5}{N_1-1}\pi\right)\text{ and }\cos\left(\frac{i-0.5}{N_1-1}\pi\right)$$

in the definition of $N_2(i)$ and $\text{offset}_1(i)$ will be adapted to $\cos((\hat{\phi}(i)+\hat{\phi}(i+1))/2)$ and $\cos((\hat{\phi}(i)+\hat{\phi}(i-1))/2)$, respectively. The determination of the index i will also be adapted on the basis of $\hat{\phi}(i)$.

In a third embodiment, step E210 consists in demultiplexing and sequentially decoding the 2 indices i, j. This decoding is sequential because the number of possible values $N_2(i)$ for the azimuth depends on the colatitude index i. In a first variant, this demultiplexing and sequential decoding will use fixed-rate binary decoding for the indices i and j on respectively $\lceil \log_2 N_1 \rceil$ bits and $\lceil \log_2 N_2(i) \rceil$ bits, where $\lceil . \rceil$ denotes the rounding to the higher integer, with the convention $\lceil 0 \rceil=0$. The demultiplexing therefore takes place sequentially in order to read a bit string of variable total bit length $\lceil \log_2 N_1 \rceil+\lceil \log_2 N_2(i) \rceil$, and i, is demultiplexed first, thereby making it possible to determine $N_2(i)$ and thus to be able to demultiplex j. This explains why the arrows between decoding (E211-*k*) and demultiplexing (E210) are double-headed arrows.

In a second variant, the indices will be demultiplexed and decoded sequentially with Huffman entropy decoding or arithmetic decoding. It is possible to use an estimate of the probability of each value (symbol) i between 0 and $N_1-1$ by determining the partial surface area of the sphere in the "spherical slice" associated with i for colatitude, this area being normalized by the total area of the sphere for this same coordinate $\phi_k$, that is to say:

$$Prob(0)=\frac{A(0,\phi_{max})}{A_{tot}}=\left(1-\cos\frac{\hat{\phi}(0)+\hat{\phi}(1)}{2}\right)$$

$$Prob(i)=\frac{A(\phi_{min},\phi_{max})}{A_{tot}}=\left(\cos\frac{\hat{\phi}(i)+\hat{\phi}(i-1)}{2}-\cos\frac{\hat{\phi}(i)+\hat{\phi}(i+1)}{2}\right),$$
$$i=1,\ \dots\ ,N_1-2$$

-continued $$Prob(N_1-1)=\frac{A(\phi_{\min},\pi)}{A_{tot}}=\left(\cos\frac{\hat{\phi}(N_1-1)+\hat{\phi}(N_1-2)}{2}+1\right)$$

in the case of a dictionary including the poles.

The coding of the index j may simply be carried out with a fixed length because, in this case, the probability estimate would be equiprobable ($Prob(j|i)=1/N_2(i)$ if $N_2(i)>1$) for a uniform distribution on the sphere. In some variants, other estimates of the probabilities Prob(i) and Prob(j|i) will be possible if the distribution of the source on the sphere in dimension 3 is assumed to be non-uniform.

In some variants according to the invention, the colatitude $\phi$ over $[0, \pi]$ is replaced with an elevation over $[-\pi/2, \pi/2]$. In this case, the number of levels is expressed as a function of the cosine instead of the sine, for example $$N_2(i)=\max\left(1,\left[\frac{360}{\alpha}\cos\hat{\phi}(i)\right]\right).$$

In this case, it is sufficient to apply the corresponding conversion (colatitude $\phi$ to elevation by converting $$\frac{\pi}{2}-\phi$$

and vice versa), in particular the sine (respectively cosine) function for computing the number of points on each spherical zone is replaced with a cosine (respectively sine) function.

Colatitude or elevation may, in some variants, be in a unit other than radians, for example in degrees.

Figure 3A:
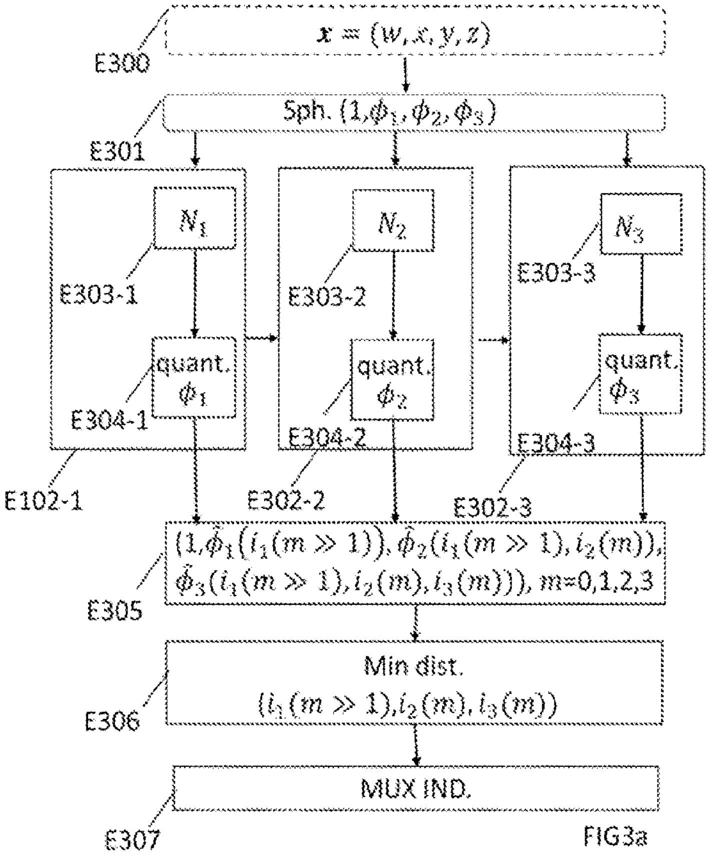
FIG. 3*a* illustrates, in the form of a flowchart, the steps implemented in a coding method according to one embodiment, in dimension 4, of the invention.
Figure 3B:
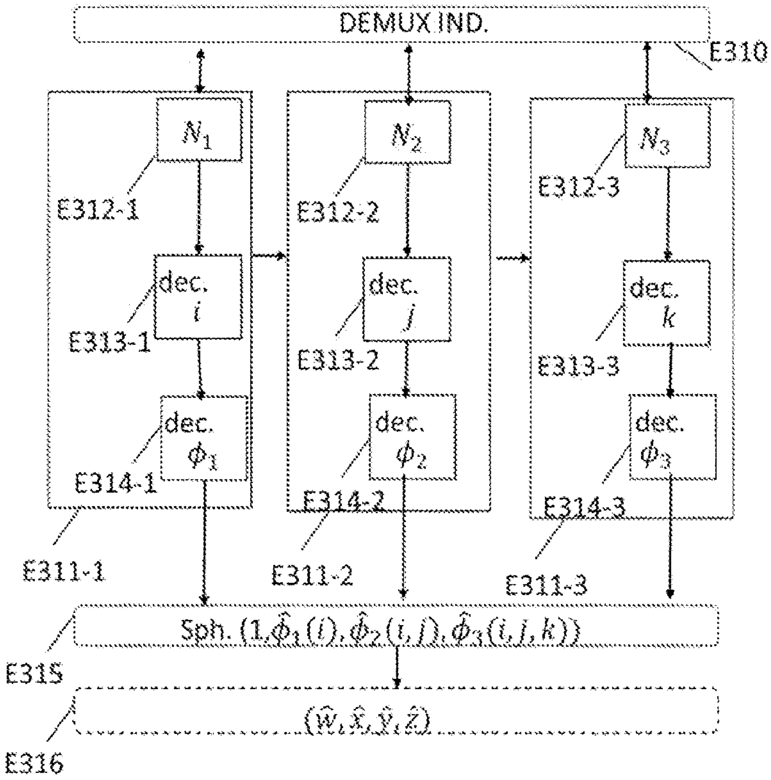
FIG. 3*b* illustrates, in the form of a flowchart, the steps implemented in a decoding method according to one embodiment, in dimension 4, of the invention.

FIGS. 3*a* and 3*b* are now described in order to illustrate the case of quantization in dimension 4.

FIG. 3*a* describes a method for coding an input point on a sphere of dimension 4.

The radius, which is set here at 1, is omitted. In some variants and for certain applications (for example quantization of a sub-band in transform-based coding), it will be possible to code a radius separately (corresponding to a mean amplitude level per sub-band for example).

For an input point on the 4D unit sphere (a, b, c, d) or (w, x, y, z) in E300, the mathematical definition of the spherical coordinates (E301) in dimension 4 for a 4D point (a, b, c, d) is adopted here without loss of generality:

$a=\cos\phi_1$ $b=\sin\phi_1\cos\phi_2$ $c=\sin\phi_1\sin\phi_2\cos\phi_3$ $d=\sin\phi_1\sin\phi_2\sin\phi_3$ where $\phi_1$ is over $[0, \pi]$ or $[0, \pi/2]$ according to the invention, $\phi_2$ is over $[0, \pi]$ and $\phi_3$ is over $[0, 2\pi]$.

In this step E301, a conversion of the spherical coordinates is optionally carried out, for example in order to obtain angles in degrees or to convert the spherical coordinates from one convention to another.

According to the invention, the spherical input data are represented by a quasi-uniform discretization (here in the sense of the uniformity of the area of the decision regions and of the distribution of the points) of the sphere $\mathbb{S}_3$. The grid is thus defined by a sequential scalar quantization of the spherical coordinates $\phi_1$, $\phi_2$, $\phi_3$.

In a first embodiment, the grid is defined based on an angular resolution $\alpha$ (in degrees) as follows by generalizing the first embodiment of the 3D case to the 4D case.

The angle $\phi_1$ is coded by uniform scalar quantization in E302-1 on $N_1$ reconstruction levels over the interval $[0, \pi]$ (including the bounds 0 and $\pi$ as reconstruction levels):

$$\hat{\phi}_1(i) = \frac{i}{N_1 - 1}\pi,\ i = 0, \ldots, N_1 - 1$$

where $N_1$ is defined in E303-1 by $$N_1 = 2\left[\frac{90}{\alpha}\right] + 1$$

so as to have an odd number of levels $N_1$ and [.] is the rounding to the nearest integer. The angular resolution is therefore $$\frac{\pi}{N_1 - 1}.$$

In E302-2, the angle $\phi_2$ is coded by uniform scalar quantization on $N_2(i)$ levels over the interval $[0, \pi]$ (including the bounds 0 and $\pi$ as reconstruction levels):

$$\hat{\phi}_2(i, j) = \frac{j}{N_2(i) - 1}\pi,\ j = 0, \ldots, N_2(i) - 1$$

where $N_2$ is defined in E303-2 by $$N_2(i) = \max\left(1, \left[\frac{180}{\alpha}\sin\hat{\phi}_1(i)\right]\right).$$

By definition, $N_2(0)=1$ and $N_2(N_1-1)=1$.

In some variants, it is possible to ensure that the number $N_2$ gives odd values (so as to include the "equator" of the 3D sphere brought about by the relationship $\phi_1=\hat{\phi}_1(i)$) when $N_2>1$, that is to say:

$$N_2(i) = \max\left(1, 2\left[\frac{90}{\alpha}\sin\hat{\phi}_1(i)\right] + 1\right)$$

The number of reconstruction levels $N_2(i)$ thus depends on the value of $\hat{\phi}_1(i)$ In E304-3, the angle $\phi_3$ is coded by uniform scalar quantization on $N_3(i, j)$ levels, taking into account the cyclic nature of the interval $[0,2\pi]$:

$$\hat{\phi}_3(i, j, k) = \delta(i, j) + \frac{k}{N_3(i, j)}2\pi,\ k = 0, \ldots, N_3(i, j) - 1$$

where $N_3$ is defined in E303-3 by $$N_3(i, j) = \max\left(1, \left[\frac{360}{\alpha}\sin\hat{\phi}_1(i)\sin\hat{\phi}_2(i, j)\right]\right)$$

and $\delta(i, j)$ is a predetermined offset according to the invention. Preferably, since the case of dimension 4 is far more complex than dimension 3, it will be preferable to set $\delta(i)$ to non-stored values, for example:

$$\delta(i, (N_2(i) - 1)/2) = 0 \text{ and } \delta(i, j) = \frac{\pi}{N_3(i, j)},\ i = 1, \ldots, N_2(i, j) - 2,$$

that is to say half the scalar quantization step (excluding poles and equator).

$\delta(i,j)=0$

The advantage of these two variants is that they do not require storing the values of $\delta(i, j)$. However, in some variants, it will be possible to store values $\delta(i)$ obtained by learning, as in the 3D case.

By definition, $N_3(0,0)=1$ and $N_3(N_1-1,0)=1$ for the dictionaries defined with preference.

The number of points in the grid $\{(\hat{\phi}_1(i), \hat{\phi}_2(i, j), \hat{\phi}_3(i, j, k))\}$ is therefore:

$$N_{tot} = \sum_{i=0}^{N_1-1}\sum_{j=0}^{N_2(i)-1} N_3(i, j)$$

The spherical grid is therefore defined as the following spherical vector quantization dictionary:

$$\{(1, \hat{\phi}_1(i), \hat{\phi}_2(i, j), \hat{\phi}_3(i, j, k)) \mid i = 0, \ldots, N_1 - 1; j = 0, \ldots, N_2(i) - 1, k = 0, \ldots, N_3(i, j) - 1\}$$

Table 5 gives some examples of resolutions a (in degrees) for obtaining a number of points $N_{tot}$ that makes it possible to get as close as possible to a target rate (in bits). The values of $\alpha$ are indicative here and, in some variants, other values may be used.

TABLE 5

| Target Rate (bits) | $2^R$ | $\alpha$ (in degrees) | $N_{tot}$ |
|---|---|---|---|
| 12 | 4096 | 9.3658447265625 | 4094 |
| 15 | 32768 | 4.8005828857421875 | 31599 |
| 18 | 262144 | 2.403336524963379 | 262142 |
| 21 | 2097152 | 1.2040135264396667 | 2096223 |
| 24 | 16777216 | 0.6047395206987858 | 16776471 |

In some variants, the number of levels $N_1$ may be set directly (to an odd value). The angular resolution then corresponds to the quantization step:

$$\alpha = \frac{180}{N_1 - 1}.$$

The values of $N_2(i)$ and $N_3(i,j)$ are easily derived therefrom:

$$N_2(i) = \max\left(1, \left[(N_1 - 1)\sin\hat{\phi}_1(i)\right]\right)$$

$$N_3(i, j) = \max\left(1, \left[2(N_1 - 1)\sin\hat{\phi}_1(i)\sin\hat{\phi}_2(i, j)\right]\right)$$

Table 6 gives some examples of a number of points $N_{tot}$ for values $N_1$ that make it possible to get close to a target rate (in bits).

TABLE 6

| Target Rate (bits) | $2^R$ | N | $N_{tot}$ |
|---|---|---|---|
| 12 | 4096 | 19 | 3708 |
| 15 | 32768 | 37 | 29012 |
| 18 | 262144 | 75 | 255704 |
| 21 | 2097152 | 149 | 2054388 |
| 24 | 16777216 | 297 | 16479056 |

A description will now be given of an optimum search algorithm for the mean squared error, this corresponding to the length of the chord between $(\phi_1, \phi_2, \phi_3)$ and $\{(\hat{\phi}_1(i), \hat{\phi}_2(i,j), \hat{\phi}_3(i, j, k))\}$, or a quantity associated with the angular distance (or geodesic distance), this corresponding to the length of a portion of a large circle between these two points—the unit radius is omitted.

In some variants, other definitions of spherical coordinates in dimension 4 will be possible, including by permuting and/or inverting the sign of the Cartesian coordinates associated with the input of the coding and the output of the decoding.

Hereinafter, in the computing of the arccos function, it will be possible to ensure that the variable denoted x here of the function arccos x satisfies $-1 \le x \le 1$ so as to avoid numerical problems, and if this is not the case x=1 will be forced if x>1 and x=−1 will be forced if x<−1.

The quantization of the spherical coordinates and the search are carried out sequentially due to the dependencies between successive spherical coordinates in the definition of the grid. To avoid divisions by zero, according to the invention, a sequential determination of $\phi_1$, $\phi_2$, $\phi_3$ is carried out:

Given a 4D point (w, x, y, z) in E300, assumed to be on the sphere $\mathbb{S}_3$ (with a radius 1), $\phi_1$ is first determined in E301 as:

$$\phi_1 = \arccos w$$

The angle $\phi_1$ is first coded in E302-1.

If $||w|-1|<\varepsilon$ with for example $\varepsilon=10^{-7}$, then it is possible to directly code $\phi_1$ at 0 (i=0) if w>0 or $\pi$ ($i=N_1-1$) if w<0), and the angles $\phi_2$, $\phi_3$ are coded at predetermined (zero) default values. This in particular avoids having to deal with numerical precision problems with possible divisions by 0 when computing the coordinates $\phi_2$, $\phi_3$.

The decoded point $(\hat{w}(m), \hat{x}(m), \hat{y}(m), \hat{z}(m))$, m=0, may be reconstructed by converting $(\hat{\phi}_1(i), 0, 0)$ to Cartesian coordinates (with a radius of the sphere at 1). The coding is then finished. It should be noted that, in this "degenerate" case, only one candidate was retained instead of the 4 candidates for the general case.

If not, if $||w|-1|<\varepsilon$ is not satisfied, in order for the 4D search to be optimum, it is necessary to retain the 2 closest values $\hat{\phi}_1(i)$ (the closest of index $i_1(0)$ and the second closest $i_1(1)$) in step E304-1:

$$i_1(0) = \arg\min_{i=0,\ldots,N_1-1} \left(\phi_1 - \hat{\phi}_1(i)\right)^2$$

$$i_1(1) = \arg\min_{\substack{i=0,\ldots,N_1-1 \\ i \neq i_1(0)}} \left(\phi_1 - \hat{\phi}_1(i)\right)^2$$

In some variants, it is possible to determine $i_1(0)$ and $i_1(1)$ by direct quantization—one exemplary embodiment for the case of a uniform scalar dictionary of the form $$\hat{\phi}_1(i) = \frac{i}{N_1-1}\pi$$

is given below:

if $\phi_1=0$, $i_1(0)=0$ and $i_1(1)=1$ if not:

if $\phi_1=\pi$, $i_1(0)=N_1-1$, $i_1(1)=N_1-2$ if not: $i_1(0)=\lfloor \phi_1/s \rfloor$ and $i_1(1)=\lceil \phi_1/s \rceil$, where $\lfloor . \rfloor$ and $\lceil . \rceil$ denote the rounding to the lower and higher integer (respectively) and $$s = \frac{\pi}{N_1-1}$$

is the scalar quantization step

This thus gives two indices corresponding to the two points of the dictionary $\{\hat{\phi}_1(i_1(0)), \hat{\phi}_1(i_1(1))\}$ closest to $\phi_1$.

Next, in E304-2, the angle $\phi_2$ defined in E301 is coded by:

$$\phi_2 = \arccos b/\sqrt{b^2+c^2+d^2}$$

If $||x/\sqrt{x^2+y^2+z^2}|-1|<\varepsilon$ with for example $\varepsilon=10^{-7}$, it is possible to directly code $\phi_2$ at 0 ($i_2(0)=i_2(1)=0$) if x>0 or $\pi$ ($i_2(0)=N_1(i_1(0))-1$, $i_2(1)=N_2(i_1(1))-1$) if x<0, and $\phi_3$ is coded at a predetermined (zero) default value. The candidate $(\hat{w}(m), \hat{x}(m), \hat{y}(m), \hat{z}(m))$, m=0 or 1 closest to (w, x, y,z) is selected after conversion of spherical to Cartesian coordinates of $(\hat{\phi}_1(i_1(0)), \hat{\phi}_2(i_1(0), i_2(0)), 0)$ and $(\hat{\phi}_1(i_1(1)), \hat{\phi}_2(i_1(1), i_2(1)), 0)$.

The distance criterion may be the Euclidean distance or the scalar product. The selected quantization indices corresponding to the selected point: $(i_1(m), i_2(m), 0)$, m=0 or 1. The global index is: $index=offset_1(i_1(m))+offset_2(i_1(m), i_2(m))$ if the candidate of index m is the closest one. The coding is then finished. It should be noted that, in this "degenerate" case, one candidate out of two possible ones was retained instead of the 4 candidates for the general case.

If not, if $||x/\sqrt{x^2+y^2+z^2}|-1|<\varepsilon$ is not satisfied, in order for the 4D search to be optimum, it is necessary to retain 4 candidates $\hat{\phi}_2(i_1(m)>>1, i_2(m))$, m=0, . . . , 3 in E304-2:

$$i_2(0) = \arg\min_{i=0,\ldots,N_2(i_1(0))-1} \left(\phi_2 - \hat{\phi}_2(i_1(0), i)\right)^2$$

$$i_2(1) = \arg\min_{\substack{i=0,\ldots,N_2(i_1(0))-1 \\ j \neq i_2(0)}} \left(\phi_2 - \hat{\phi}_2(i_1(0), i)\right)^2$$

and $$i_2(2) = \arg\min_{i=0,\ldots,N_2(i_1(1))-1} \left(\phi_2 - \hat{\phi}_2(i_1(1), i)\right)^2$$

$$i_2(3) = \arg\min_{\substack{i=0,\ldots,N_2(i_1(1))-1 \\ j \neq i_2(2)}} \left(\phi_2 - \hat{\phi}_2(i_1(1), i)\right)^2$$

In some variants, it is possible to determine $i_2(2l)$ and $i_1(2l+1)$, for l=0,1, by direct quantization-one exemplary embodiment for the case of a uniform scalar dictionary of the form $$\hat{\phi}_2(i, j) = \frac{j}{N_2(i) - 1}\pi$$

is given below:

if $\phi_2=0$, $i_2(2l)=0$ and $i_2(2l+1)=1$ if not:

if $\phi_2=\pi$, $i_2(2l)=N_1-1$, $i_2(2l+1)=N_1-2$ if not: $i_2(0)=\lfloor\phi_2/s\rfloor$ and $i_2(1)=\lceil\phi_2/s\rceil$, where $\lfloor . \rfloor$ and $\lceil . \rceil$ denote the rounding to the lower and higher integer (respectively) and $$s = \frac{\pi}{N_2(i_1(l)) - 1}$$

is the scalar quantization step

Next, in E303-3, the angle $\phi_3$ defined in E301 is coded by:

$$\phi_3 = \begin{cases} \arccos y/\sqrt{y^2+z^2} & z \geq 0 \\ 2\pi - \arccos y/\sqrt{y^2+z^2} & z < 0 \end{cases}$$

In some variants, it is possible to use the arctan function over 4 quadrants (denoted arctan 2):

$\phi_3=\arctan 2(z,y)$ but in this case the angle $\phi_3$ is defined in $[-\pi, \pi]$ and it will be necessary to adapt the quantization dictionary (with an offset of $-\pi$).

The angle $\phi_3$ is coded in E302-3 by uniform scalar quantization with an adaptive number of levels $N_3(i, j)$ as described above where $i=i_1(m>>1)$ and $j=i_2(m)$, $m=0, \ldots, 3$ so as to obtain 4 corresponding values in E304-3 $\hat{\phi}_3(i_1(m>>1), i_2(m), i_3(m))$, $m=0, \ldots, 3$.

This may be carried out as described in the 3D case for step E204-2, by replacing $\theta$ with $\phi_3$, $N_2(i)$ with $N_3(i, j)$ and $\delta(i_1(m))$ with $\delta(i_1(m>>1), i_2(m))$.

In step 305, this gives four candidates ($2^{n-2}$ with n=4) $(\hat{\phi}_1(i_1(m>>1)), \hat{\phi}_2(i_2(m)), \hat{\phi}_3(i_3(m)))$ where the indices are given by the various combinations of $m=0, \ldots, 3$.

The candidate $(\hat{w}(m), \hat{x}(m), \hat{y}(m), \hat{z}(m))$, m=0 to 3, closest to (w, x, y, z) is selected in E306 after conversion from spherical to Cartesian coordinates of $(1, \hat{\phi}_1(i_1(m>>1)), \hat{\phi}_2(i_2(m)), \hat{\phi}_3(i_3(m)))$.

The selected quantization indices correspond to the selected point: $(i_1(m>>1), i_2(m), i_3(m))$.

The global index is obtained in E307 in the following generic form:

$$\text{index} = \text{offset}_1(i) + \text{offset}_2(i, j) + k$$

where $i=i_1(m>>1)$, $j=i_2(m)$ and $k=i_3(m)$.

The global index index is thus obtained by sequential coding of the separate quantization indices i, j, k of the best candidate.

The values $\text{offset}_1(i)$ and $\text{offset}_2(i, j)$ are for example, as described for the 3D case, cumulative cardinality sums for the respective quantization indices i and j of the spherical coordinates $\phi_1$ and $\phi_2$.

In some variants, it is possible to carry out the last step without passing back through the Cartesian coordinates, by computing a (geodesic) distance directly in the domain of the spherical coordinates.

In some variants, the conversion from Cartesian coordinates (w, x, y, z) to spherical coordinates will be optional, and spherical coordinates may be coded directly.

In a second embodiment, the coding steps are identical to those of the first embodiment, except for the step of determining the numbers $N_2(i)$ and $N_3(i, j)$ in E303-2 and E303-3 and the indexing step in E307, which are specific to this second embodiment and detailed below.

In a second embodiment, it is possible to set the number of scalar quantization levels $N_2(i)$ and $N_3(i,j)$ and the items of cardinality information $\text{offset}_1(i)$ and $\text{offset}_2(i, j)$ analytically, as described below.

In the second embodiment, the scalar quantization dictionaries are preferably defined as:

$$\hat{\phi}_1(i) = \frac{i}{N_1 - 1}\pi,\ i = 0, \ldots, N_1 - 1,$$

where for example $$N_1 = 2\left\lceil\frac{90}{\alpha}\right\rceil + 1$$

$$\hat{\phi}_2(i, j) = \frac{j}{N_2(i) - 1}\pi,\ j = 0, \ldots, N_2(i) - 1,$$

where $N_2(i)$ is set as described below $$\hat{\phi}_3(i, j, k) = \delta(i, j) + \frac{k}{N_3(i, j)}2\pi,\ k = 0, \ldots, N_3(i, j) - 1,$$

where $N_3(i, j)$ is set as described below and $\delta(i, j)$ is a predetermined offset according to the invention as in the first embodiment. In some variants, other definitions will be possible.

It will be recalled that the area of the surface of the sphere $\mathbb{S}_3$ of radius r is $A_{tot}=2\pi^3r^3$. The partial area of a "complete" spherical zone defined by the interval $[0, \phi_1]$ on the first coordinate is given below:

$$A_1(0, \phi_1^{max}) = r^3\int_0^{\phi_1^{max}}\int_{\phi_2=0}^{\pi}\int_{\phi_3=0}^{2\pi}\sin^2\phi_1\sin\phi_2\,d\phi_1\,d\phi_2\,d\phi_3 = 2\pi r^3\left(\phi_1^{max} - \frac{1}{2}\sin(2\phi_1^{max})\right)$$

and the partial area of an "incomplete" spherical zone defined by the intervals $[0, \phi_1]$ on the first coordinate and $[0, \phi_2^{max}]$ on the second coordinate:

$$A_2(0, \phi_1^{max}, 0, \phi_2^{max}) = r^3\int_0^{\phi_1^{max}}\int_0^{\phi_2^{max}}\int_{\phi_3=0}^{2\pi}\sin^2\phi_1\sin\phi_2\,d\phi_1\,d\phi_2\,d\phi_3 = \pi r^3\left(\phi_1^{max} - \frac{1}{2}\sin(2\phi_1^{max})\right)(1 - \cos\phi_2^{max})$$

The values $N_2(i)$ and $N_3(i, j)$ giving the number of values of the coded coordinate $\phi_2$ and $\phi_3$ in each "spherical slice"

associated with the coded coordinate $\phi_1$ of index i will be set in this case so as to allow analytical indexing in the form described below.

This makes it possible to define the total number of points:

$$N_{tot}=\sum_{i=0}^{N_1-1}\sum_{j=0}^{N_2(i)-1}N_3(i,j)$$

In the second embodiment, the values $N_2$ and $N_3$ are defined in E303-2 and E303-3 in the following form:

$$N_2(i)=\max\left(1,2\left[\frac{90}{\alpha}\sin\hat{\phi}_1(i)\right]+1\right)$$

Following the example given above for the 3D case, the following is determined:

$$N_3(i,j)=1\text{ if }i=0\text{ or }N_1-1,\text{ or if }j=0\text{ or }N_2(i)-1$$

$$N_3(i,j)=\left[\left(1-\cos\left(\frac{j+0.5}{N_2(i)-1}\pi\right)\right)\frac{N_{subtot}(i)}{2}\right]-\left[\left(1-\cos\left(\frac{i-0.5}{N_2(i)-1}\pi\right)\right)\frac{N_{subtot}(i)}{2}\right]\text{ otherwise}$$

$$\text{where }N_{subtot}(i)=\left[\left(\frac{i+0.5}{N_1-1}\pi-\frac{1}{2}\sin\left(\frac{i+0.5}{N_1-1}2\pi\right)\right)\frac{N_{tot}}{\pi}\right]-\left[\left(\frac{i-0.5}{N_1-1}\pi-\frac{1}{2}\sin\left(\frac{i-0.5}{N_1-1}2\pi\right)\right)\frac{N_{tot}}{\pi}\right]$$

$$\text{for }i=1,\ldots,N_1-2.$$

In some variants, other methods for determining $N_{subtot}$ (i) will be possible, this value being critical for the correct functioning of the decoding.

The determination of the cardinality sums in E307 is given by:

$$\text{offset}_1(0)=0$$

$$\text{offset}_1(i)=\left[\left(\frac{i-0.5}{N_1-1}\pi-\frac{1}{2}\sin\left(\frac{i-0.5}{N_1-1}2\pi\right)\right)\frac{N_{tot}}{\pi}\right],\ i=1,\ldots,N_1-1$$

$$\text{offset}_2(i,0)$$

$$\text{offset}_2(i,j)=\left[\left(1-\cos\left(\frac{j-0.5}{N_2(i)-1}\pi\right)\right)\frac{N_{subtot}(i)}{2}\right],$$

In a third embodiment, all of the coding steps E301 to E306 are identical and step E307 consists in sequentially coding, in binary, the 3 indices $i_1(m^*>>2)$, $i_2(m^*)$, $i_3(m^*)$, abbreviated to i, j, k, corresponding to the best candidate. This coding is sequential because the numbers of possible values $N_2(i)$ and $N_3(i,j)$ for the coordinates $\phi_2$ and $\phi_3$ depend respectively on the index i and the indices i, j. The index i, is multiplexed first, followed by the index j and finally the index k.

In a first variant, this sequential coding will use binary coding with a fixed rate of i, j, k on $\lceil\log_2 N_1\rceil$ bits, $\lceil\log_2 N_2(i)\rceil$ and $\lceil\log_2 N_3(i,j)\rceil$ bits, respectively, where $\lceil.\rceil$ denotes the rounding to the higher integer, with the convention $\lceil 0\rceil=0$. The multiplexing therefore takes place sequentially in order to form a bit string of variable total bit length $\lceil\log_2 N_1\rceil+\lceil\log_2 N_2(i)\rceil+\lceil\log_2 N_3(i,j)\rceil$. It should be noted that, when $N_2(i)=1$, the coding takes 0 bits for the index j and, when $N_3(i,j)=1$, the coding takes 0 bits for the index k, and there is therefore no bit to be multiplexed in this case.

In a second variant, the indices i, j, k will be coded sequentially with Huffman entropy coding or arithmetic coding. It is possible to use an estimate of the probability of each value of the index i between 0 and $N_1$ by determining the partial surface area of the sphere in the slice associated with the index i for the coordinate $\phi_1$, this area being normalized by the total area of the sphere for this same coordinate $\phi_1$, that is to say:

$$Prob(0)=\frac{A_1(0,\phi_1^{max})}{A_{tot}}=\frac{1}{\pi}\left(\phi_1^{max}-\frac{1}{2}\sin(2\phi_1^{max})\right)\text{ with }\phi_1^{max}=\left(\hat{\phi}_1(0)+\hat{\phi}_1(1)\right)/2$$

$$Prob(i)=\frac{A(\phi_{min},\phi_{max})}{A_{tot}}=\frac{1}{\pi}\left(\phi_1^{max}-\frac{1}{2}\sin(2\phi_1^{max})-\phi_1^{min}-\frac{1}{2}\sin(2\phi_1^{min})\right),$$

$$i=1,\ldots,N_1-2,\text{ with}$$

$$\phi_1^{max}=\left(\hat{\phi}_1(i)+\hat{\phi}_1(i+1)\right)/2\text{ and }\phi_1^{min}=\left(\hat{\phi}_1(i)+\hat{\phi}_1(i+1)\right)/2$$

$$Prob(N_1-1)=\frac{A(\phi_{min},\pi)}{A_{tot}}=\frac{1}{\pi}\left(\pi-\phi_1^{min}-\frac{1}{2}\sin(2\phi_1^{min})\right),$$

$$\text{where }\phi_1^{min}=\left(\hat{\phi}_1(N_1-2)+\hat{\phi}_1(N_1-1)\right)/2$$

The coding of the index j may use a probability, as for the index in the 3D case:

$$Prob(j=0|i)=\frac{A(0,\phi_{max})}{A_{tot}}=\frac{1}{2}\left(1-\cos\frac{\hat{\phi}_2(0)+\hat{\phi}_2(1)}{2}\right)$$

$$Prob(j|i)=\frac{A(\phi_{min},\phi_{max})}{A_{tot}}=\frac{1}{2}\left(\cos\frac{\hat{\phi}_2(i)+\hat{\phi}_2(i-1)}{2}-\cos\frac{\hat{\phi}_2(i)+\hat{\phi}_2(i+1)}{2}\right),$$

$$i=1,\ldots,N_2(i)-2$$

$$Prob(j=N_2(i)-1|i)=\frac{A(\phi_{min},\pi)}{A_{tot}}=\frac{1}{2}\left(\cos\frac{\hat{\phi}_2(N_1-1)+\hat{\phi}_2(N_1-2)}{2}+1\right)$$

in the case of a dictionary including the poles.

The coding of the index k may simply be carried out with a fixed length because, in this case, the probability estimate would be equiprobable ($Prob(k|i,j)=1/N_3(i,j)$ if $N_3(i,j)>1$) for a uniform distribution on the sphere. In some variants, other estimates of the probabilities Prob(i), Prob(j|i) and Prob(k|i, j) will be possible if the distribution of the source on the sphere in dimension 4 is assumed to be non-uniform.

The corresponding decoding method, for dimension 4, is now described with reference to FIG. 3*b*.

The decoding is first of all described for a first embodiment.

Given the global index index in step E310, sequential decoding of the three spherical coordinates is carried out in steps E311-1, E311-2 and E311-3.

In step E312-1, as in coding step E303-1, a number of scalar quantization levels $N_1$ is determined.

The index i of the angle $\phi_1$ is found in E313-1 by way of a search in the cardinality table:

$$i=\max\{l\in\{0,\ldots,N_1-1\}|\text{index}<\text{offset}_1(l+1)\}$$

To this end, the following convention is defined:

$$\text{offset}_1(N_1)=N_{tot}$$

In one embodiment, the cardinality table has been stored in memory, in full or in part.

In some variants, it is possible not to store the values $\text{offset}_1(i)$ and/or $\text{offset}_2(i, j)$, but to compute them "online" (in real time).

In some variants, it is possible to store or compute "online" (in real time) only $(N_1-1)/2+1$ values of the table $\text{offset}_1(i)$. The same principle is applicable to $\text{offset}_2(i, j)$.

The angle $\phi_1$ decoded in E314-1 is reconstructed as:

$$\hat{\phi}_1(i)=\frac{i}{N_1-1}\pi$$

E312-2 comprises computing the number of reconstruction levels, for example $$N_2(i)=\max\left(1,\left[\frac{360}{\alpha}\sin\hat{\phi}_1(i)\right]\right).$$

In some variants, other dictionaries may be defined, as in the coding.

The index j of the angle $\phi_2$ is found in E313-2 by subtraction according to index←index−$\text{offset}_1(i)$ and by carrying out a search in another cumulative cardinality table:

$$i=\max\{l\in\{0,\ldots,N_2(i)-1\}|\text{index}<\text{offset}_2(i,l+1)\}$$

The angle $\phi_2$ decoded in E314-2 is reconstructed as:

$$\hat{\phi}_2(i,j)=\frac{j}{N_2(i)-1}\pi$$

The number of reconstruction levels $$N_3(i,j)=\max\left(1,\left[\frac{360}{\alpha}\sin\hat{\phi}_1(i)\sin\hat{\phi}_{2,i}(j)\right]\right).$$

is computed in E312-3.

The index k of the angle $\phi_3$ is found in E313-3 by subtraction according to k=index−$\text{offset}_2(i,j)$.

The value of the offset $\delta(i, j)$ is determined and the angle $\phi_3$ in E314-3 is then reconstructed as:

$$\hat{\phi}_3(i,j,k)=\delta(i,j)+\frac{k}{N_3(i,j)}2\pi,\ k=0,\ldots,N_3(i,j)-1$$

This thus gives the spherical coordinates $(\hat{\phi}_1(i), \hat{\phi}_2(i, j), \hat{\phi}_3(i, j, k))$ of the decoded point in E315. In this step E315, a conversion of the spherical coordinates is optionally carried out, for example in order to convert the decoded angles into degrees or to adapt the convention to a definition of the spherical coordinates.

In E316, it is then possible to reconstruct the decoded point as follows:

$\hat{w}=\cos\hat{\phi}_1(i)$ $\hat{x}=\sin\hat{\phi}_1(i)\cos\hat{\phi}_2(i, j)$ $\hat{y}=\sin\hat{\phi}_1(i)\sin\hat{\phi}_2(i,j)\cos\hat{\phi}_3(i, j, k)$ $\hat{z}=\sin\phi_1\sin\hat{\phi}_2(i,j)\sin\hat{\phi}_3(i, j, k)$ Step E316 will be adapted to other spherical coordinate systems and units other than radians where applicable.

In some variants, the last step of converting spherical coordinates to Cartesian coordinates will be optional.

In a second embodiment, the decoding steps are identical to those of the first embodiment, except for the step of determining the indices $i_1$, $i_2$ and $i_3$, denoted i, j, k here, in E313-1, E313-2 and E313-3 and the step of determining the number $N_3(i, j)$ in E313-3.

The decoding of the index i in E313-1, in a second embodiment, may be carried out analytically by taking the value:

$$i=\left[\frac{N_1-1}{\pi}f^{-1}\left(\frac{\text{index}+0.5}{\frac{N_{tot}}{\pi}}\right)\right]$$

where $$f(x)=x-\frac{1}{2}\sin 2x$$

for $$x\epsilon[0,\pi]$$

and $f^{-1}(x)$ is the inverse of this function f(x).

However, there is no obvious analytical solution for $f^{-1}(x)$.

In one embodiment, it will be possible to determine and store the values of f(x) for $x=i\cdot\pi/(N_f-1)$, where $N_f$ is for example set to 10000. In practice, sufficient numerical precision is required in order for the decoding of i to function correctly.

In another embodiment, a Taylor series piecewise approximation will be used. The interval $[0, \pi/2]$ is divided into multiple sub-intervals and $f^{-1}(x)$ is approximated, for example in the form:

$$f(x)\approx\begin{cases}\frac{2}{3}x^3, & x\epsilon[0,\pi/12]\\ \frac{\pi}{12}-\frac{\sqrt{3}}{4}+x/2, & x\epsilon\left[0,\frac{3\pi}{12}\right]\\ \frac{\pi}{8}-\frac{1}{2}+x, & x\epsilon\left[\frac{3\pi}{12},\frac{3\pi}{4}\right]\\ 2x-\frac{\pi}{2}, & x\epsilon\left[\frac{3\pi}{4},\frac{\pi}{2}\right]\end{cases}$$

and the property $f(\pi-x)=\pi-f(x)$ is added. It is thus easy to determine $f^{-1}(x)$ piecewise by simply inverting each term on each subinterval, with the property $f^{-1}(\pi-x)=\pi-f^{-1}(x)$. In some variants, it will be possible to use more subintervals.

The number of levels in step E312-2 for the decoding of $\hat{\phi}_2(i, j)$ is given for example by:

$$N_2(i)=\max\left(1,2\left[\frac{90}{\alpha}\sin\hat{\phi}_1(i)\right]+1\right)$$

The index j is found in E313-2 after having updated the global index:

$$\text{index}\leftarrow\text{index}-\text{offset}_1(i)$$

analytically as in the 3D case according to the following formula:

$$j = \left[\frac{N_2(i)-1}{\pi}\arccos\left(1-\frac{\text{index}+0.5}{\frac{N_{subtot}(i)}{2}}\right)\right]$$

where $$N_{subtot}(i) = \left[\left(\frac{i+0.5}{N_1-1}\pi - \frac{1}{2}\sin\left(\frac{i+0.5}{N_1-1}2\pi\right)\right)\frac{N_{tot}}{\pi}\right] - \left[\left(\frac{i-0.5}{N_1-1}\pi - \frac{1}{2}\sin\left(\frac{i-0.5}{N_1-1}2\pi\right)\right)\frac{N_{tot}}{\pi}\right]$$

for $$i = 1, \ldots , N_1 - 2.$$

In some variants, other methods for determining $N_{subtot}$ (i) will be possible, this value being critical for the correct functioning of the decoding.

If i=0 or i=$N_1$−1, the decoding of the index j in E313-2 is reduced to setting j=0.

The number of levels in step E312-3 for the decoding of $\hat{\phi}_3$(i, j, k) is given by:

$$N_3(i, j) = 1 \text{ if } i = 0 \text{ or } N_1 - 1, \text{ or if } j = 0 \text{ or } N_2(i) - 1$$

$$N_3(i, j) = \left[\left(1-\cos\left(\frac{j+0.5}{N_2(i)-1}\pi\right)\right)\frac{N_{subtot}(i)}{2}\right] - \left[\left(1-\cos\left(\frac{i-0.5}{N_2(i)-1}\pi\right)\right)\frac{N_{subtot}(i)}{2}\right]$$

otherwise.

The index k is found in E313-3 by subtraction according to the following formula: k=index−offset$_2$(i,j) with $$\text{offset}_2(i, 0) = 0$$

$$\text{offset}_2(i, j) = \left[\left(1-\cos\left(\frac{j-0.5}{N_2(i)-1}\pi\right)\right)\frac{N_{subtot}(i)}{2}\right],$$

In this case too, if i=0 or i=$N_1$−1, or if j=0 or j=$N_2$(i)−1, the decoding of the index k in E313-3 is reduced to setting k=0.

In a third embodiment, step E310 consists in demultiplexing and sequentially decoding the 3 indices i, j, k. This coding is sequential because the numbers of possible values $N_2$(i) and $N_3$(i,j) for the coordinates $\phi_2$ and $\phi_3$ depend respectively on the index i and the indices i, j. In a first variant, this demultiplexing and sequential decoding will use fixed-rate binary decoding for the indices i, j, k on $\lceil \log_2 N_1 \rceil$ bits, $\lceil \log_2 N_2(i) \rceil$ and $\lceil \log_2 N_3(i, j) \rceil$ bits, respectively, where $\lceil . \rceil$ denotes the rounding to the higher integer, with the convention $\lceil 0 \rceil$=0. The demultiplexing therefore takes place sequentially in order to read a bit string of variable bit length $\lceil \log_2 N_1 \rceil + \lceil \log_2 N_2(i) \rceil + \lceil \log_2 N_3(i, j) \rceil$.

In a second variant, the indices will be demultiplexed and decoded sequentially with Huffman entropy decoding or arithmetic decoding. It is possible to use an estimate of the probability of each value (symbol) i between 0 and $N_1$−1 by determining the partial surface area of the sphere in the slice associated with the index i for the coordinate $\phi_1$, this area being normalized by the total area of the sphere for this same coordinate $\phi_1$, that is to say:

$$Prob(0) = \frac{A_1(0, \phi_1^{max})}{A_{tot}} = \frac{1}{\pi}\left(\phi_1^{max} - \frac{1}{2}\sin(2\phi_1^{max})\right)$$

with $$\phi_1^{max} = \left(\hat{\phi}_1(0) + \hat{\phi}_1(1)\right)/2$$

$$Prob(i) = \frac{A(\phi_{min}, \phi_{max})}{A_{tot}} = \frac{1}{\pi}\left(\phi_1^{max} - \frac{1}{2}\sin(2\phi_1^{max}) - \phi_1^{min} - \frac{1}{2}\sin\left(2\phi_1^{min}\right)\right),$$

$$i = 1, \ldots , N_1 - 2,$$

with $$\phi_1^{max} = \left(\hat{\phi}_1(i) + \hat{\phi}_1(i+1)\right)/2$$

and $$\phi_1^{min} = \left(\hat{\phi}_1(i) + \hat{\phi}_1(i+1)\right)/2$$

$$Prob(N_1 - 1) = \frac{A(\phi_{min}, \pi)}{A_{tot}} = \frac{1}{\pi}\left(\pi - \phi_1^{min} - \frac{1}{2}\sin(2\phi_1^{max})\right),$$

where $$\phi_1^{min} = \left(\hat{\phi}_1(N_1 - 2) + \hat{\phi}_1(N_1 - 1)\right)/2$$

The decoding of the index j may use a probability, as for the index in the 3D case:

$$Prob(j = 0 \mid i) = \frac{A(0, \phi_{max})}{A_{tot}} = \frac{1}{2}\left(1 - \cos\frac{\hat{\phi}_2(0) + \hat{\phi}_2(1)}{2}\right)$$

$$Prob(j \mid i) = \frac{A(\phi_{min}, \phi_{max})}{A_{tot}} = \frac{1}{2}\left(\cos\frac{\hat{\phi}_2(i) + \hat{\phi}_2(i-1)}{2} - \cos\frac{\hat{\phi}_2(i) + \hat{\phi}_2(i-1)}{2}\right),$$

$$i = 1, \ldots , N_2(i) - 2$$

$$Prob(j = N_2(i) - 1 \mid i) = \frac{A(\phi_{min}, \pi)}{A_{tot}} = \frac{1}{2}\left(\cos\frac{\hat{\phi}_2(N_1 - 1) + \hat{\phi}_2(N_1 - 2)}{2} + 1\right)$$

in the case of a dictionary including the poles.

The decoding of the index k may simply be carried out with a fixed length because, in this case, the probability estimate would be equiprobable (Prob(k|i,j)=1/$N_3$(i,j) if $N_3$(i,j)>1) for a uniform distribution on the sphere. In some variants, other estimates of the probabilities Prob(i), Prob (j|i) and Prob(k|i, j) will be possible if the distribution of the source on the sphere in dimension 4 is assumed to be non-uniform.

In some variants, another definition of the spherical coordinates may be used and the invention will be adapted accordingly (for example by changing cosine terms to sine, sine terms to cosine, arccos terms to arcsin, etc., where applicable).

In some variants, the angles may be in another unit, for example in degrees.

Figure 4:
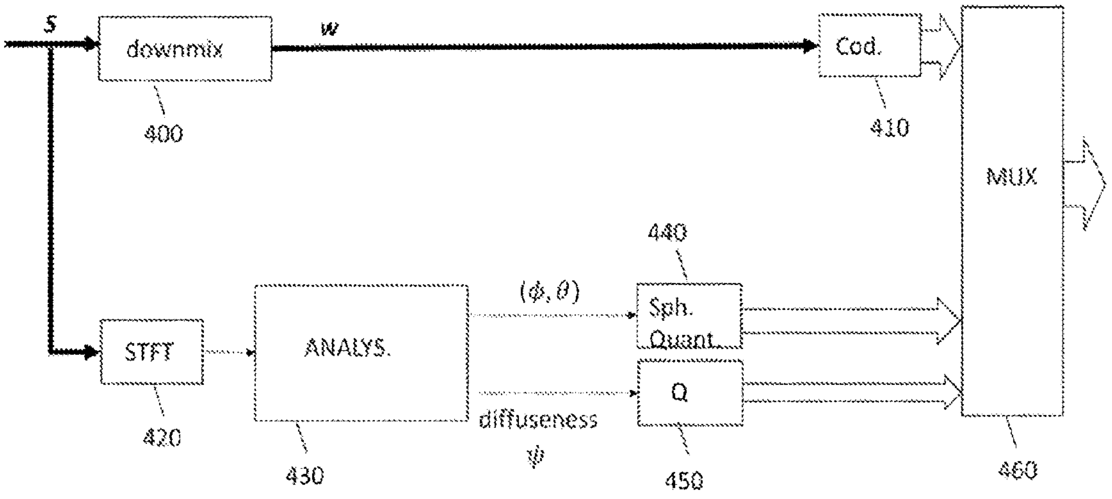
FIG. 4 illustrates one embodiment of a coding device implementing a coding method according to one embodiment, in dimension 3, of the invention.

FIG. 4 illustrates one embodiment of an encoder comprising a coding device implementing the coding method as described above for dimension 3.

The input signal S here is a 1st-order ambisonic signal, with channels typically organized in the order W Y Z X (according to the ACN convention) with normalization for example according to the SN3D convention. The signal is decomposed into frames, which are assumed here to be 20 ms, for example 960 samples per channel at 48 KHz.

In this exemplary embodiment, the coding is parametric and consists in reducing the number of channels (block 400), where only one channel is coded (block 410) here, for example with the 3GPP EVS codec at 24.4 kbit/s, and in coding spatial metadata, which correspond here to DiRAC parameters (DoA and "diffuseness").

The input signal is decomposed (block 420) into frequency sub-bands by a Fourier transform with 50% overlap and sinusoidal windowing that is known from the prior art. A division into Bark bands is assumed here, for example 20 sub-bands distributed into frequencies on the Bark scale that are known from the prior art.

It should be noted that it is important to temporally align the coding of the downmix signal and the application of spatial data; the appropriate temporal compensation is not detailed here and depends on the coding delay (block 410) and on the time/frequency analysis (block 420). In some variants, other types of filter banks may be used.

In each frame and each sub-band, two parameters are estimated (block 430)—to lighten the notations, no frame index or sub-bands are used for the various parameters: the direction of the dominant source (DoA) in terms of elevation ($\phi$) and azimuth ($\theta$), and the "diffuseness" $\psi$ as described in the abovementioned article by Pulkki. The DoA is generally estimated by way of the active intensity vector with a temporal mean; in some variants, it will be possible to implement other methods for estimating $\phi$, $\theta$, $\psi$.

The DoA is coded in each frame and each sub-band; according to the invention, this coding directly takes as input the spherical coordinates for each sub-band (1, $\phi$, $\theta$). It should be noted that it is assumed here-without loss of generality—that $\phi$ represents an elevation in degrees (between −90 and +90 degrees) and not a colatitude, and $\theta$ is an azimuth between −180 and 180 degrees. For example, it is possible to take a grid with a target rate of 16 bits so as to have a resolution of less than 1 degree. The coding in block 440 follows the steps of FIG. 2*a*.

In the preferred embodiment, use is made of an implementation that minimizes storage for the indexing with the second embodiment of the spherical vector quantization in dimension 3.

We start in E201 by adapting the definition of the spherical coordinates so as to return to a colatitude $\phi$ in radians over $[0, \pi]$ and an azimuth $\theta$ in radians over $[0,2\pi]$:

$$\phi \leftarrow \frac{\pi}{2} - \frac{\phi}{180}\pi$$

$$\theta \leftarrow \mathrm{mod}_{2\pi}\left(\frac{\theta}{180}\pi\right)$$

where $\mathrm{mod}_{2\pi}(\theta)$ is the operation modulo $2\pi$ returning to $[0,2\pi]$, which may be simplified here by: if $\theta<0$, $\mathrm{mod}_{2\pi}(\theta)=\theta+2\pi$ We start from $N_{tot}=65536$ (that is to say $2^{16}$) and $$\hat{\phi}(i) = \frac{i}{N_1 - 1}\pi, \quad i = 0, \dots, N_1 - 1$$

where $N_1$ is defined in E203-1 by $N_1=229$, and $$\hat{\theta}(i, j) = \delta(i) + \frac{j}{N_2(i)}2\pi, \quad j = 0, \dots, N_2(i) - 1$$

where $\delta(i)$ is given by:

$$\delta((N_1 - 1)/2) = \delta(0) = \delta(N_1) = 0$$

$$\delta(i) = \delta\left(i + \frac{N_1 - 1}{2}\right) = \frac{\pi}{N_2(i)}, \quad i = 1, \dots, \frac{N_1 - 1}{2} - 1$$

and $N_2$ is defined in E203-2 by $$N_2(i) = \max\left(1, \left[\left(1 - \cos\left(\frac{i + 0.5}{N_1 - 1}\pi\right)\right)\frac{N_{tot}}{2}\right] - \left[\left(1 - \cos\left(\frac{i - 0.5}{N_1 - 1}\pi\right)\right)\frac{N_{tot}}{2}\right]\right), \quad i = 0, \dots, N_1 - 1$$

The coding of $\phi$ and $\theta$ is carried out as described with reference to FIG. 2*a*, with at most two candidates. The global index on 16 bits (from 0 to 65535) is determined here according to the second embodiment:

$$\mathrm{index} = \mathrm{offset}_1(i) + j$$

where $\mathrm{offset}_1(i)$ is obtained directly and analytically:

$$\mathrm{offset}_1(0) = 0$$

$$\mathrm{offset}_1(i) = \left[\left(1 - \cos\left(\frac{i - 0.5}{N_1 - 1}\pi\right)\right)\frac{N_{tot}}{2}\right], \quad i = 1, \dots, N_1 - 1$$

In some variants, it is possible to use the first embodiment of the spherical vector quantization in dimension 3 with:

$$N_1 = 2\left[\frac{90}{\alpha}\right] + 1$$

with $\alpha=0.7929811477661133$, thereby giving $N_1=227$ $$N_2(i) = \max\left(1, \left[\frac{360}{\alpha}\sin\hat{\phi}(i)\right]\right)$$

$$\delta((N_1 - 1)/2) = \delta(0) = \delta(N_1) = 0,$$

$$et\,\delta(i) = \delta\left(i + \frac{N_1 - 1}{2}\right) = \frac{\pi}{N_2(i)}, \quad i = 1, \dots, \frac{N_1 - 1}{2} - 1$$

The indexing may be carried out with the values $\mathrm{offset}_1(i)$ stored and listed as follows for $i=0, \dots, N_1$:

{0, 1, 7, 20, 39, 64, 96, 134, 178, 228, 285, 348, 417, 492, 574, 662, 756, 856, 962, 1074, 1193, 1318, 1449, 1586, 1729, 1878, 2033, 2194, 2360, 2532, 2710, 2894, 3084, 3279, 3480, 3687, 3899, 4117, 4340, 4569, 4803, 5043, 5288, 5538, 5793, 6054, 6320, 6591, 6867, 7148, 7434, 7725, 8021, 8321, 8626, 8936, 9250, 9569, 9892, 10220, 10552, 10888, 11228, 11573, 11922, 12275, 12632, 12992, 13356, 13724, 14096, 14471, 14850, 15232, 15618, 16007, 16399, 16794, 17192, 17593, 17997, 18404, 18814, 19226, 19641, 20059, 20479, 20901, 21326, 21753, 22182, 22613, 23046, 23481, 23918, 24356, 24796, 25237, 25680, 26124, 26569, 27016, 27464, 27913, 28363, 28813, 29264, 29716, 30168, 30621, 31074, 31528, 31982, 32436, 32890, 33344, 33798, 34252, 34705, 35158, 35610, 36062, 36513, 36963, 37413, 37862, 38310, 38757, 39202, 39646, 40089, 40530, 40970, 41408, 41845, 42280, 42713, 43144, 43573, 44000, 44425, 44847, 45267, 45685, 46100, 46512, 46922, 47329, 47733, 48134, 48532, 48927, 49319, 49708, 50094, 50476, 50855, 51230, 51602, 51970, 52334, 52694, 53051, 53404, 53753, 54098, 54438, 54774, 55106, 55434, 55757, 56076, 56390, 56700, 57005, 57305, 57601, 57892, 58178, 58459, 58735, 59006, 59272, 59533, 59788, 60038, 60283, 60523, 60757, 60986, 61209, 61427, 61639, 61846, 62047, 62242, 62432, 62616, 62794, 62966, 63132, 63293, 63448, 63597, 63740, 63877, 64008, 64133, 64252, 64364, 64470, 64570, 64664, 64752, 64834, 64909, 64978, 65041, 65098, 65148, 65192, 65230, 65262, 65287, 65306, 65319, 65325, 65326}

Other variants of the invention may be implemented to code the DoA.

In some variants, the definitions of $\hat{\phi}(i)$, $\hat{\theta}(i, j)$, $\delta(i)$ and $N_2(i)$ may be adapted in an obvious manner if the angles $\phi$, $\theta$ are given in degrees and correspond to the elevation and the azimuth. In this case, the conversion in E201 will not be necessary.

The "diffuseness" $\psi$ is a parameter between 0 and 1, and is coded here (block 450) by uniform scalar quantization on for example 6 bits (64 values) by rounding it to the nearest value:

$$\hat{\psi}=63\cdot\text{ind}$$

where the quantization index ind=0, . . . , 63 is:

$$ind = [\psi/63]$$

In some variants, various coding methods, such as uniform or non-uniform scalar quantization, or vector quantization jointly coding $\psi$ in multiple sub-bands, with or without entropy coding, may be used.

The spatial metadata coding budget is therefore 20×(16+6)=440 bits per frame, that is to say 22 kbit/s.

The downmix signal coding bit string and the coded spatial parameters are multiplexed (block 460) so as to form the bit string of each frame. In this exemplary embodiment, the coding rate here is 46.4 kbit/s.

In some variants, other coding rates of the DoA will be possible.

Figure 5:
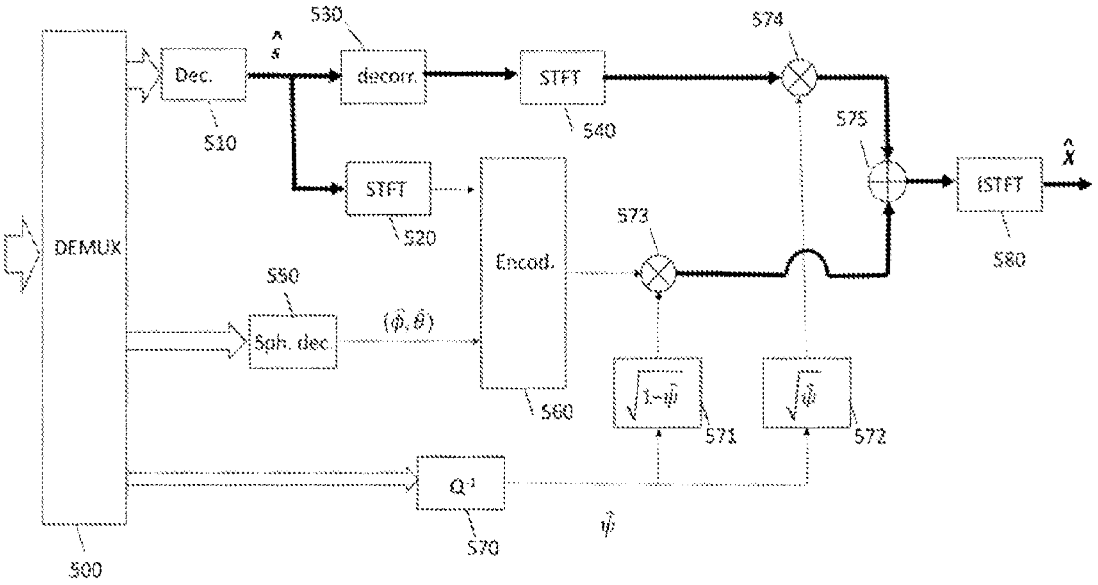
FIG. 5 illustrates one embodiment of a decoding device implementing a decoding method according to one embodiment, in dimension 3, of the invention.

FIG. 5 illustrates one embodiment of a decoder comprising a decoding device implementing the decoding method as described above for dimension 3.

After demultiplexing of the bit string (block 500), the downmix signal is decoded (block 510), here by way of EVS decoding at 24.4 kbit/s.

The spatial parameters are decoded (block 550 and block 570).

The decoding in block 550 follows the steps of FIG. 2*b*.

In the preferred embodiment, the elevation will therefore be decoded according to the second embodiment of the vector quantization in dimension 3 based on the indication index for each frame and sub-band (block 550) as two sub-indices i and j according to the second embodiment, with $N_{tot}$=65536 in E213-1:

$$i = \left[\frac{N_1 - 1}{\pi}\arccos\left(1 - \frac{\text{index} + 0.5}{\frac{N_{tot}}{2}}\right)\right]$$

The number of levels in E212-2 is:

$$N_2(i) = \max\left(1, \left[\left(1 - \cos\left(\frac{i + 0.5}{N_1 - 1}\pi\right)\right)\frac{N_{tot}}{2}\right] - \left[\left(1 - \cos\left(\frac{i - 0.5}{N_1 - 1}\pi\right)\right)\frac{N_{tot}}{2}\right]\right)$$

The colatitude is decoded as:

$$\hat{\phi}(i) = \frac{i}{N_1 - 1}\pi,\ i = 0, \ldots, N_1 - 1$$

The index j of the azimuth is found in E213-2: j=index−off $set_1(i)$

The azimuth is decoded as:

$$\hat{\theta}(i, j) = \delta(i) + \frac{j}{N_2(i)}2\pi,\ j = 0, \ldots, N_2(i) - 1$$

where $\delta(i)$ is identical to the definition in block 440. An inverse conversion step is also added in E215:

$$\hat{\phi} \leftarrow \left(\frac{\pi}{2} - \hat{\phi}(i)\right)\frac{180}{\pi}$$

$$\hat{\theta} \leftarrow \frac{\hat{\theta}(i, j)}{\pi}180 \text{ and then } \hat{\theta} \leftarrow \hat{\theta} - 360 \text{ if } \hat{\theta} > 180$$

In one variant embodiment, the DoA parameters will be decoded according to the first embodiment of the vector quantization in dimension 3 according to the invention, with in particular the same definitions of $N_1$, $N_2(i)\delta(i)$ and $\text{offset}_1(i)$ as in the encoder.

Other variants of the invention may be implemented to code the DoA. In some variants, the definitions of $\hat{\phi}(i)$, $\hat{\theta}(i, j)$, $\delta(i)$ and $N_2(i)$ may be adapted in an obvious manner if the angles $\phi$, $\theta$ are given in degrees and correspond to the elevation and the azimuth. In this case, the conversion in E215 will not be necessary.

This decoded signal s is then decomposed into times/frequencies (block 520 identical to block 420) so as to spatialize it as a point source (plane wave) in the block (block 560) that generates a spatialized 1st-order ambisonic signal as follows:

$$X(\hat{\phi}, \hat{\theta}) = \begin{bmatrix} 1 \\ \cos\hat{\phi}\cos\hat{\theta} \\ \cos\hat{\phi}\sin\hat{\theta} \\ \sin\hat{\phi} \end{bmatrix} .\hat{s}$$

noting that the decoded angles (elevation $\hat{\phi}$ and azimuth $\hat{\theta}$) are in degrees.

Based on the decoded signal, a decorrelation is carried out (block 530) so as to have a "diffuse" version (corresponding to a maximum source width); this decorrelation also achieves an increase in the number of channels so as, at the output of block 530, to obtain a 1st-order ambisonic signal (in ACN, SN3D format for example) with 4 channels (W, Y, Z, X). The decorrelated signal is decomposed into times/frequencies (block 540).

The carrying out of the decorrelation is not described in detail here, and it is possible to take all-pass decorrelator filters implemented by convolution by predetermined impulse responses; in some variants, it is also possible to swap blocks 530 and 540 so as to have decorrelation (and an increase in the number of channels) in the frequency domain.

The signals resulting from blocks 540 and 560 are combined (block 575) by sub-band, after applying a scaling factor (blocks 573 and 574) obtained from the decoded "diffuseness" (blocks 571 and 572); this adaptive mixing makes it possible to "dose" the source width and the diffuse character of the sound field in each sub-band. The mixed signal is converted into the time domain (block 580) by way of inverse Fourier transform and addition-overlap. In some variants, other types of filter banks may be used.

It should be noted that it is important to temporally align the decoding and the decorrelation of the downmix signal and the application of the spatial data; the appropriate temporal compensations are not detailed here and depend on the decoding delay (block 510) and on the time/frequency analysis (blocks 520, 540) and on the decorrelation (block 530).

Figure 6:
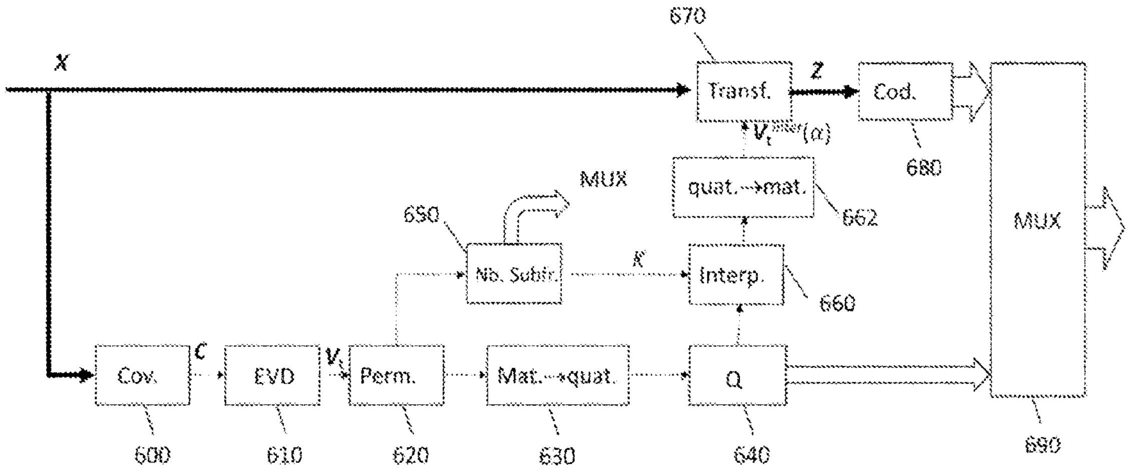
FIG. 6 illustrates one embodiment of a coding device implementing a coding method according to one embodiment, in dimension 4, of the invention.

FIG. 6 illustrates one embodiment of an encoder comprising a coding device implementing the coding method as described above for dimension 4.

In this one embodiment of the invention, the quantization of a dual quaternion is carried out as described above for the coding on the sphere $\mathbb{S}_3$.

FIG. 6 illustrates a coding method in the case where the quaternion-based representation is used for the coding of the rotation matrices. The coding takes place in multiple steps:

- The signals on the channels (for example W, Y, Z, X for the FOA case) are assumed to be in matrix form X with a matrix n×L (for n ambisonic channels (here 4) and L samples per frame). These channels may optionally be pre-processed, for example by way of a high-pass filter.
- A principal component analysis PCA or, in equivalent fashion, a Karhunen Loeve transform (KLT) is applied to these signals, with covariance matrix estimation (block 600) and eigenvalue decomposition (block 610), denoted EVD, so as to obtain eigenvalues and a matrix of eigenvectors based on a covariance matrix of the n signals.
- The matrix of eigenvectors, which is obtained for the current frame t, undergoes signed permutations (block 620) so that it is as aligned as much as possible with the matrix of the same kind of the previous frame t−1, in order to ensure maximum coherence between the matrices between two frames. It is also ensured in block 620 that the matrix of eigenvectors of the current frame t, thus corrected by signed permutations, correctly represents the application of a rotation.
- The matrix of eigenvectors for the current frame t (which is a rotation matrix) is converted into an appropriate domain of quantization parameters (block 630). The case is adopted here of a conversion into 2 unit quaternions for a 4×4 matrix; this would give a single unit quaternion for a 3×3 matrix in the planar ambisonic case.
- These parameters are then coded using a coding method as described with reference to FIG. 2*a* (block 640) on a number of bits allocated to the quantization of parameters.
- The current frame is divided into subframes, the number of which may be set or adaptive—in the latter case, this number may be determined on the basis of the information resulting from the PCA/KLT analysis, and it may optionally be transmitted (block 650). The coded quaternion-based representation is interpolated (block 660) by successive subframes from the previous frame t−1 to the current frame t, in order to smooth the difference between inter-frame matrixing over time. The interpolated quaternions in each subframe are converted into rotation matrices (block 662), and then the resulting decoded and interpolated rotation matrices are applied (block 670). In each frame, a matrix n×(L/K) representing each of the K subframes of the signals of the ambisonic channels is obtained at the output of block 670 in order to decorrelate these signals as far as possible before the coding (for example multi-mono coding). Binary allocation to the separate channels is also carried out.

Thus, in the quantization block 640, the unit quaternions obtained in E630 are quantized.

A first embodiment based on the first embodiment of the vector quantization in dimension 4 is presented.

Given two unit quaternions $q_i=(a_i, b_i, c_i, d_i)$, i=1, 2 a first quaternion, for example $q_1$, is first of all forced to have a positive component, here the real component ($a_1$). To this end, it is checked whether the real component $a_i$ is negative. If this is the case, the two quaternions $q_1$ and $q_2$ are replaced with their opposites $-q_1$ and $-q_2$. It will be recalled that this operation does not change the 4D rotation matrix associated with the dual quaternion.

These two unit quaternions $q_1$ and $q_2$ are coded according to the first embodiment of the spherical vector quantization on the sphere $\mathbb{S}_3$, with the following parameters:

$$N_1 = 2\left[\frac{90}{\alpha}\right] + 1$$

with α=2 degrees, thereby giving $N_1=91$ $$N_2(i) = \max\left(1, \left[\frac{180}{\alpha}\sin\hat{\phi}_1(i)\right]\right),$$

thereby giving $N_2(i)=\max(1, [90 \sin \hat{\phi}_1(i)])$ $$N_3(i, j) = \max\left(1, \left[\frac{360}{\alpha}\sin\hat{\phi}_1(i)\sin\hat{\phi}_2(i, j)\right]\right),$$

thereby giving $N_3(i, j)=\max(1, [180 \sin \hat{\phi}_1(i) \sin \hat{\phi}_2(i, j)])$ Consideration is given here to the preferred case of uniform scalar quantization dictionaries for $\hat{\phi}_1(i)$, $\hat{\phi}_2(i,j)$ and $\hat{\phi}_3(i, j, k)$.

The indexing may be carried out with the items of cardinality information $\text{offset}_1(i)$ stored and listed as follows for i=0, . . . , $N_1$:

{0, 1, 9, 61, 163, 359, 685, 1125, 1747, 2519, 3521, 4713, 6183, 7883, 9809, 12093, 14633, 17575, 20807, 24343, 28181, 32487, 37121, 42097, 47405, 53057, 59061, 65421, 72137, 79205, 86625, 94415, 102345, 110629, 119263, 128017, 137097, 146515, 156043, 165637, 175551, 185515, 195535, 205837, 216183, 226545, 236911, 247273, 257619, 267921, 277941, 287905, 297819, 307413, 316941, 326359, 335439, 344193, 352827, 361111, 369041, 376831, 384251, 391319, 398035, 404395, 410399, 416051, 421359, 426335, 430969, 435275, 439113, 442649, 445881, 448823, 451363, 453647, 455573, 457273, 458743, 459935, 460937, 461709, 462331, 462771, 463097, 463293, 463395, 463447, 463455, 463456}

The items of cardinality information $offset_2(i, j)$ are not detailed here for the sake of conciseness. In some variants, it is possible to store the items of cardinality information $offset_2(i, j)$ in a one-dimensional table with first of all $offset_2(0,0)$, and then $offset_2(1,j)$, j=0, . . . , $N_2(1)$, etc.—because of the symmetry with respect to the equator (of index i=45 for the given example), it is thus possible to store only a given subset (for example 2692 values) corresponding to the North hemisphere and the equator with $offset_2(i, j)$, i=0, . . . , $(N_1-1)/2$, the values corresponding to the South hemisphere with $offset_2(i,j)$, $i=(N_1-1)/2+1, \ldots, N_1-1$ being identical to $offset_2(N_1-1-i, j)$; the use of a one-dimensional table requires having an additional table of $N_1(=91)$ values that make it possible to find the first element off $set_2(i, 0)$ for each value of i.

The coding of $q_1$ requires, according to the invention, one bit fewer than the coding of $q_2$, because the constraint $a_1 \geq 0$ is utilized. Indeed, the coding of $q_1$ will have indices ranging from 0 to 226544 (on 18 bits), while the coding of $q_2$ will have indices ranging from 0 to 463455 (on 19 bits). The coding of the 2 quaternions therefore requires 37 bits. The two indices (18 and 19 bits) resulting from block 640 are multiplexed in block 690.

In some variants, the roles of $q_1$ and $q_2$ may obviously be swapped in order to force a component (for example $a_2$) to be positive for the quantization.

In some variants, other embodiments of the spherical vector quantization in dimension 4 according to the invention will be possible. In particular, it is possible to use the third embodiment in which the indices i, j, k for each quaternion $q_1$ and $q_2$ are multiplexed sequentially with simple separate binary coding of the indices. For the given example in which $$N_1 = 2\left[\frac{90}{\alpha}\right] + 1$$

with α=2 degrees, unereby giving $N_1=91$ $$N_2(i) = \max\left(1, \left[\frac{180}{\alpha}\sin\hat{\phi}_1(i)\right]\right),$$

thereby giving $N_2(i)=\max(1, [90 \sin \hat{\phi}_1(i)])$ $$N_3(i, j) = \max\left(1, \left[\frac{360}{\alpha}\sin\hat{\phi}_1(i)\sin\hat{\phi}_2(i, j)\right]\right),$$

thereby giving $N_3(i,j)=\max(1, [180 \sin \hat{\phi}_1(i) \sin \hat{\phi}_2(i,j)])$ for the quaternion $q_1$ the index i is coded and multiplexed on 6 bits because the constraint $a_1 \geq 0$ forces the quaternion into the North hemisphere and i is included in i=0, . . . , $(N_1-1)/2$, and then the indices j and k are multiplexed on a number of bits that is variable as a function of $N_2(i)$ and $N_3(i, j)$. The same is done for the quaternion $q_2$, except that the index i is coded and multiplexed on 7 bits.

Figure 7:
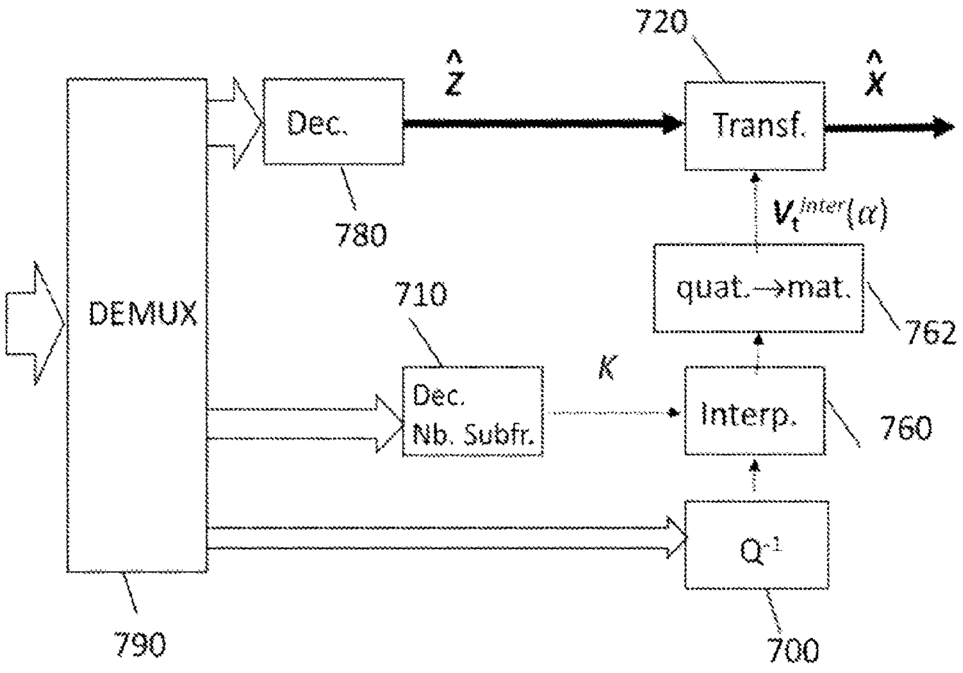
FIG. 7 illustrates one embodiment of a decoding device implementing a decoding method according to one embodiment, in dimension 4, of the invention.

FIG. 7 illustrates the corresponding decoding.

The quantization indices of the quantization parameters of the rotation matrix in the current frame are demultiplexed (block 790) and decoded in block 700 according to a decoding method as described with reference to FIG. 3*b*.

The details of the exemplary embodiment with reference to FIG. 6 are not repeated here. The same parameters as in the coding are used. In this example, the decoding of $q_1$ uses the indices ranging from 0 to 226544 (on 18 bits), while the decoding of $q_2$ uses the indices ranging from 0 to 463455 (on 19 bits). The demultiplexing (block 790) will therefore read 37 bits of the bit string so as to separate the two indices, one on 18 bits and the other on 19 bits.

In some variants, other embodiments of the spherical vector quantization in dimension 4 according to the invention will be possible. In particular, it is possible to use the third embodiment in which the respective indices i, j, k for each quaternion $q_1$ and $q_2$ are demultiplexed sequentially with simple separate binary coding of the indices, the index i being coded and multiplexed on 1 bit fewer for one of the two quaternions.

The steps of conversion and interpolation (blocks 760, 762) performed by the decoder are identical to those carried out at the encoder (blocks 660 and 662). If the number of interpolation subframes is adaptive, it is decoded (block 710)—otherwise, this number of interpolation subframes is set to a predetermined value.

Block 720 applies, for each subframe, the inverse matrixing resulting from block 762 to the decoded signals (block 780) of the ambisonic channels, recalling that the inverse of a rotation matrix is its transpose.

In some variants, it is possible to apply the invention to transform-based audio coding, for example mono, in which the signal is for example divided into frequency sub-bands that are coded by gain-shape vector quantization. The TDAC coding described in section 6.6.9 (coding) and section 7.3.5 (decoding) of ITU-T recommendation G.729.1 is adopted here by way of illustration for at least the coding of a sub-band at at least one coding rate, for example the sub-band of index 17 of 8 coefficients for the rate of 16 bits. A person skilled in the art will know how to adapt the invention to this coding in at least one sub-band (for example of dimension n=8) and to a given rate (for example 16 bits).

In some variants, the invention may be applied to other transform-based audio encoders and decoders, mono or multi-mono in some examples.

Figure 8:
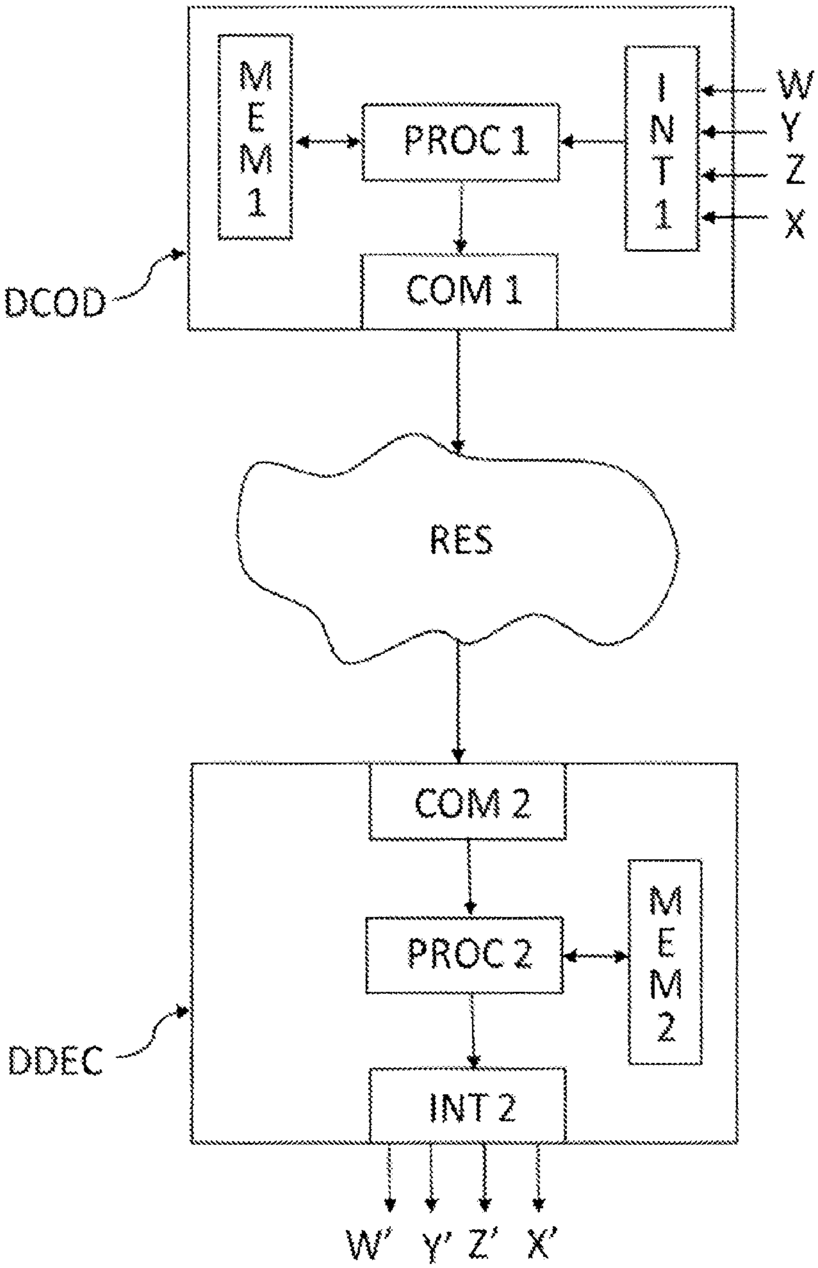
FIG. 8 illustrates structural exemplary embodiments of a coding device and of a decoding device according to one embodiment of the invention.

FIG. 8 illustrates a coding device DCOD and a decoding device DDEC, within the sense of the invention, these devices being dual to each other (in the sense of "reversible") and connected to one another by a communication network RES.

The coding device DCOD comprises a processing circuit typically including:

- a memory MEM1 for storing instruction data of a computer program within the sense of the invention (these instructions possibly being distributed between the encoder DCOD and the decoder DDEC);
- an interface INT1 for receiving an original multichannel signal B, for example an ambisonic signal distributed over various channels (for example four 1st-order channels W, Y, Z, X) with a view to compression-coding it within the sense of the invention;

a processor PROC1 for receiving this signal and processing it by executing the computer program instructions stored in the memory MEM1, with a view to coding it; and a communication interface COM 1 for transmitting the coded signals via the network.

The decoding device DDEC comprises its own processing circuit, typically including:

a memory MEM2 for storing instruction data of a computer program within the sense of the invention (these instructions possibly being distributed between the encoder DCOD and the decoder DDEC as indicated above);

an interface COM2 for receiving the coded signals from the network RES with a view to compression-decoding them within the sense of the invention;

a processor PROC2 for processing these signals by executing the computer program instructions stored in the memory MEM2, with a view to decoding them; and an output interface INT2 for delivering the decoded signals, for example in the form of ambisonic channels W . . . X, with a view to rendering them.

Of course, this FIG. 8 illustrates one example of a structural embodiment of a codec (encoder or decoder) within the sense of the invention. FIGS. 1 to 6, commented on above, describe more functional embodiments of these codecs in detail.

Although the present disclosure has been described with reference to one or more examples, workers skilled in the art will recognize that changes may be made in form and detail without departing from the scope of the disclosure and/or the appended claims.

The invention claimed is:

1. A method performed by a coding device and comprising:

receiving a multichannel signal;

coding at least one parameter derived from the multichannel signal, represented by an input point on a sphere of dimension n, carried out by coding n−1 spherical coordinates of this input point so as to define a spherical grid, the coding comprising the following operations:

a) sequential scalar quantization of the n−1 spherical coordinates, defining a spherical grid, comprising the following for a current spherical coordinate to be coded:

determining a number of scalar quantization levels for the current spherical coordinate to be coded, on the basis of the previously coded spherical coordinates when the current spherical coordinate to be coded is of index superior to 1;

scalar quantization of said current spherical coordinate on the basis of said determined number of levels, with, for n−2 coordinates, determination of two closest candidates for the current spherical coordinate to be coded and giving two quantization indices, in order to obtain at most $2^{n-2}$ candidates at the end of the sequential scalar quantization of the n−1 coordinates;

b) selecting a best candidate that minimizes a distance between the input point and the at most $2^{n-2}$ candidates, and determining the separate quantization indices resulting from the sequential scalar quantization of said spherical coordinates of said best candidate; and c) sequential coding of the separate quantization indices of said best candidate; and transmitting a result of the sequential coding via a communication network.

2. The method as claimed in claim 1, wherein the sequential coding of the separate quantization indices comprises determining a global quantization index by adding at least one item of cardinality information to the quantization index of a spherical coordinate.

3. The method as claimed in claim 1, wherein the scalar quantization of one of the n−1 spherical coordinates includes a predefined offset.

4. The method as claimed in claim 1, wherein the number of quantization levels for at least one spherical coordinate is determined on the basis of a total number of points of the spherical grid and of the surface area of a spherical zone of the sphere in dimension n.

5. The method as claimed in claim 2, wherein an item of cardinality information is determined for at least one spherical coordinate on the basis of a number of points of the spherical grid and of the surface area of a spherical zone of the sphere in dimension n.

6. The method as claimed in claim 1, wherein, for at least one spherical coordinate, the number of levels is forced to an odd value for a number other than 1.

7. The method as claimed in claim 1, wherein the at least one parameter represented by an input point on a sphere of dimension n, with n=4, is at least one unit quaternion representing a rotation matrix used for the coding of the multichannel audio signal.

8. The method as claimed in claim 1, wherein the at least one parameter represented by an input point on a sphere of dimension n, with n=3, is at least one of item of information about a direction of arrival of audio sources derived from an analysis of the multichannel audio signal.

9. The method as claimed in claim 1, wherein the at least one parameter represented by an input point on a sphere of dimension n is at least one sub-band with a value of n corresponding to a size of the sub-band of a transformation into frequency sub-bands for the coding of the multichannel audio signal.

10. The method as claimed in claim 1, wherein the two quantization indices given by the determination of two closest candidates, for the current spherical coordinate to be coded, are on the basis of the quantization indices determined for the previous spherical coordinates when the current spherical coordinate to be coded is of index superior to 1.

11. The method as claimed in claim 1, wherein transmitting a result of the sequential coding via a communication network comprises transmitting the codes separate quantization indices of said best candidate.

12. The method as claimed in claim 2, wherein transmitting a result of the sequential coding via a communication network comprises transmitting the global quantization index.

13. A decoding method performed by a decoding device and comprising:

receiving a global quantization index or on n−1 multiplexed indices via a communication network; and decoding at least one parameter derived from a multichannel signal, represented by an input point on a sphere of dimension n, carried out by decoding n−1 spherical coordinates of this input point, defining a spherical grid, the decoding comprising sequential decoding of the spherical coordinates, based on the global quantization index or on the n−1 multiplexed indices, by way of the following operations:

determining a number of quantization levels for the spherical coordinate to be decoded on the basis of the previously decoded spherical coordinates when the spherical coordinate to be decoded is of index superior to 1; and determining separate indices resulting from separate quantization of said spherical coordinates on the basis of the numbers of levels determined, and then obtaining the corresponding spherical coordinates in order to reconstruct a decoded point on the sphere of dimension n.

14. The decoding method as claimed in claim 13, wherein the separate indices are determined based on items of cardinality information defined for said spherical coordinates.

15. The decoding method as claimed in claim 13, wherein the decoding of one of the n−1 spherical coordinates includes a predefined offset.

16. The decoding method as claimed in claim 14, wherein the items of cardinality information are obtained analytically based on a number of points of the spherical grid and on the surface area of a spherical zone of the sphere in dimension n.

17. A coding device comprising:

a processing circuit configured to:

receive a multichannel signal;

code at least one parameter derived from a multichannel signal, represented by an input point on a sphere of dimension n, carried out by coding n−1 spherical coordinates of this input point so as to define a spherical grid, the coding comprising the following operations:

a) sequential scalar quantization of the n−1 spherical coordinates, defining a spherical grid, comprising the following for a current spherical coordinate to be coded:

determining a number of scalar quantization levels for the current spherical coordinate to be coded, on the basis of the previously coded spherical coordinates when the current spherical coordinate to be coded is of index superior to 1;

scalar quantization of said current spherical coordinate on the basis of said determined number of levels, with, for n−2 coordinates, determination of two closest candidates for the current spherical coordinate to be coded and giving two quantization indices, in order to obtain at most $2^{n-2}$ candidates at the end of the sequential scalar quantization of the n−1 coordinates;

b) selecting a best candidate that minimizes a distance between the input point and the at most $2^{n-2}$ candidates, and determining the separate quantization indices resulting from the sequential scalar quantization of said spherical coordinates of said best candidate; and c) sequential coding of the separate quantization indices of said best candidate; and transmit a result of the sequential coding via a communication network.

18. A decoding device comprising:

a processing circuit configured to:

receive a global quantization index or on n−1 multiplexed indices via a communication network; and decode at least one parameter derived from a multichannel signal, represented by an input point on a sphere of dimension n, carried out by decoding n−1 spherical coordinates of this input point, defining a spherical grid, the decoding comprising sequential decoding of the spherical coordinates, based on the global quantization index or on the n−1 multiplexed indices, by way of the following operations:

determining a number of quantization levels for the spherical coordinate to be decoded on the basis of the previously decoded spherical coordinates when the spherical coordinate to be decoded is of index superior to 1; and determining separate indices resulting from separate quantization of said spherical coordinates on the basis of the numbers of levels determined, and then obtaining the corresponding spherical coordinates in order to reconstruct a decoded point on the sphere of dimension n.

19. A non-transitory storage medium able to be read by a processor and storing a computer program comprising instructions for executing a coding method when the instructions are executed by the processor, wherein the coding method comprises:

receiving a multichannel signal;

coding at least one parameter derived from a multichannel signal, represented by an input point on a sphere of dimension n, carried out by coding n−1 spherical coordinates of this input point so as to define a spherical grid, the coding comprising the following operations:

a) sequential scalar quantization of the n−1 spherical coordinates, defining a spherical grid, comprising the following for a current spherical coordinate to be coded:

determining a number of scalar quantization levels for the current spherical coordinate to be coded, on the basis of the previously coded spherical coordinates when the current spherical coordinate to be coded is of index superior to 1;

scalar quantization of said current spherical coordinate on the basis of said determined number of levels, with, for n−2 coordinates, determination of two closest candidates for the current spherical coordinate to be coded and giving two quantization indices, in order to obtain at most $2^{n-2}$ candidates at the end of the sequential scalar quantization of the n−1 coordinates;

b) selecting a best candidate that minimizes a distance between the input point and the at most $2^{n-2}$ candidates, and determining the separate quantization indices resulting from the sequential scalar quantization of said spherical coordinates of said best candidate; and c) sequential coding of the separate quantization indices of said best candidate; and transmitting a result of the sequential coding via a communication network.

* * * * *